US011922873B2

(12) United States Patent
Van Eessen et al.

(10) Patent No.: US 11,922,873 B2
(45) Date of Patent: Mar. 5, 2024

(54) DRIVER FOR LED OR OLED DISPLAY AND DRIVE CIRCUIT

(71) Applicant: BARCO N.V., Kortrijk (BE)

(72) Inventors: Wim Van Eessen, Kruishoutem (BE); Patrick Willem, Ostend (BE); Peter Gerets, Roeselare (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/764,960

(22) PCT Filed: Sep. 30, 2020

(86) PCT No.: PCT/EP2020/077434

§ 371 (c)(1),
(2) Date: Mar. 29, 2022

(87) PCT Pub. No.: WO2021/064061

PCT Pub. Date: Apr. 8, 2021

(65) Prior Publication Data

US 2022/0383814 A1 Dec. 1, 2022

(30) Foreign Application Priority Data

Oct. 1, 2019 (GB) ..................................... 1914186

(51) Int. Cl.
*G09G 3/3233* (2016.01)

(52) U.S. Cl.
CPC ... *G09G 3/3233* (2013.01); *G09G 2300/0857* (2013.01); *G09G 2310/0286* (2013.01); *G09G 2320/0247* (2013.01)

(58) Field of Classification Search
CPC ......... G09G 3/3233; G09G 2300/0857; G09G 2310/0286; G09G 2320/0247
See application file for complete search history.

(56) References Cited

U.S. PATENT DOCUMENTS 6,987,787 B1 1/2006 Mick
7,071,894 B1 7/2006 Thielemans et al.
7,176,861 B2 2/2007 Dedene et al.
7,450,085 B2 11/2008 Thielemans
7,972,032 B2 7/2011 Meersman
8,339,053 B2 12/2012 Yamasaki et al.
2002/0012008 A1 1/2002 Takagi
2003/0197472 A1 10/2003 Kanauchi et al.
2006/0262054 A1 11/2006 Yamazaki et al.
(Continued)

FOREIGN PATENT DOCUMENTS

EP 1846910 B1 9/2016

OTHER PUBLICATIONS

International Search Report and Written Opinion issued in PCT/EP2020/077434, dated Mar. 19, 2021.
(Continued)

*Primary Examiner* — Kenneth B Lee, Jr.
(74) *Attorney, Agent, or Firm* — HAMRE, SCHUMANN, MUELLER & LARSON, P.C.

(57) ABSTRACT

A current control circuit for LED or OLED sub-pixels or pixels of an active matrix display is able to store bits or a bit of a control signal used to drive a pixel or sub-pixel, in a memory associated with each pixel or sub-pixel. The control circuit elements can be made compatible with thin-film processing such as to produce thin-film transistors.

21 Claims, 27 Drawing Sheets

(56) References Cited

U.S. PATENT DOCUMENTS

| | | | | |
|---|---|---|---|---|
| 2016/0300525 | A1* | 10/2016 | Segura Puchades | G09G 3/2022 |
| 2018/0144682 | A1* | 5/2018 | Tao | G09G 5/001 |
| 2018/0197471 | A1 | 7/2018 | Rotzoll | |
| 2018/0308418 | A1* | 10/2018 | Scenini | H05B 47/00 |
| 2018/0323180 | A1* | 11/2018 | Cok | H01L 23/5386 |
| 2019/0114960 | A1* | 4/2019 | Lee | G09G 3/3225 |

OTHER PUBLICATIONS

Office Action issued in corresponding Chinese Application No. 202080083359.3, dated Aug. 12, 2023, with English translation.

* cited by examiner

DRIVER FOR LED OR OLED DISPLAY AND DRIVE CIRCUIT

FIELD OF THE INVENTION

The present invention pertains to the field of displays for example solid state fixed format displays such as discrete light emitting LED or OLED displays, as well as methods of making or operating such displays, as well as optionally a controller and software for executing such methods. In particular the present invention relates to a control or drive circuit and method for a pixel or subpixel of an active LED or OLED display.

DISCUSSION OF THE PRIOR ART

The problem of achieving High Dynamic Range displays and light emitting devices is known from the art.

U.S. Pat. No. 6,987,787B1 describes a LED brightness control system for a wide-range of luminance control. The brightness of Light Emitting Diodes, used as backlighting for a Liquid Crystal Display, must be controlled over a range of at least 20000 to 1. U.S. Pat. No. 6,987,787B1 describes a LED control system wherein the duty cycle of a PWM signal is modulated at the same time as the amplitude of the current pulses. Encoding the duty cycle with 8 bits and the amplitude of the current pulses with 8 bits as well would give a total of 65,536 brightness range.

The modulation of both the duty cycle and the amplitude of the current pulses of the PWM signal would allow smaller brightness steps at the lower brightness level and larger brightness steps at the higher brightness levels.

U.S. Pat. No. 6,987,787B1 remains silent on how to address at the same time a bandwidth constraint (which would require encoding brightness on less than 16 bits) while maintaining the ability to control the brightness over a range of at least 20000 to 1. Problems associated with the stability of the color point, which varies with the amplitude of the current pulses in the LED also remain.

In U.S. Pat. No. 8,339,053 a "LED dimming apparatus" is described which makes use of two dimming regimes to control the brightness of a LED lighting device.

In a first "lower brightness" regime, the current flowing through a LED is pulse width modulated with constant current pulse amplitude. In a second "higher brightness" regime, the current flowing through the LED is controlled in analog fashion and is not pulsed. The current flowing through the LED is continuous and its amplitude is determined by a constant current circuit.

U.S. Pat. No. 8,339,053 does not offer a viable solution to drive individual LEDs of a LED display. U.S. Pat. No. 8,339,053 does not discuss the problem of visual artefacts and in particular color artifacts that are bound to exist when driving LEDs at different current amplitudes.

EP1846910B1 "Active matrix organic light emitting diode display" discloses how an active matrix OLED display can be dimmed with a PWM signal common to all pixels while avoiding color artifacts.

FIG. 1 which corresponds to FIG. 3 of EP1846910B1 shows an example of circuit that can be used to dim the light emitted by a light emitting diode with a PWM signal without affecting the color point. A transistor (element 310 on FIG. 3 of EP1846910) can be switched on and off by a PWM signal applied to its gate. When the transistor is open, no current can circulate through the OLED 308 and no light is emitted. When the transistor is closed, a current $I_{OLED}$ can circulate through the OLED 308 and light is emitted. The amplitude of the current is determined by a.o, the voltage applied to the gate of transistor 304. Since the same PWM signal is applied to each pixel of the display, there is no issue with bandwidth. An analog signal (to be loaded across the capacitor 306) is still required to "program" the luminance of the (sub-)pixel corresponding to OLED 308.

US2018/0197471A1 "Digital-drive pulse-width-modulated output system" discloses an active-matrix digital-drive display system that includes an array of pixels. Each pixel has an output device, a serial digital memory responsive to a load timing signal for receiving and storing a multi-bit digital pixel value during an uninterrupted load time period, and a drive circuit responsive to a pulse-width-modulation (PWM) timing signal and to the multi-bit digital pixel value stored in the serial digital memory to drive the output device during an uninterrupted output time period.

Digital storage is not practical for conventional flat-panel displays that use thin-film transistors because the thin-film circuits required for digital pixel value storage are much too large to achieve desirable display resolution. US2018/0197471A1 solves this problem with small micro transfer printed integrated circuits (chiplets) having a crystalline semiconductor substrate and that provide small, high-performance serial digital memory circuits and temporally controlled constant-current LED drive circuits in a digital display with practical resolution. Such a display can have excellent resolution because the chiplets are very small. The solutions disclosed in US2018/0197471A1 are not applicable for high resolution displays if chiplets are not available. An example of circuits according to US2018/0197471A1 is given in FIG. 2.

Another problem in the prior art is the load time period as disclosed in US2018/0197471A1. Indeed, let us take as an example a display tile with 160*135 LEDs. If the frame rate is 60 frames per second, sending e.g. 12 bits to 15 bits to the memory associated to each pixel must be done in less time than the PWM sub-period for the least significant bit $b_0$ (in order to avoid visual artefacts). Ideally, this should be done sequentially in order to limit the number of signal tracks that carry the signals to the pixels.

If the PWM signal is encoded with 15 bits or more, the PWM timing period for the least significant bit $b_0$ would have to be less than 0.5 μs. Loading every serial memory of the 160*135 pixels in less than 0.5 μs is not easy.

Applying the teachings of US2018/0197471A1 is appealing but appears unfeasible without using chiplets.

The art needs improvement.

SUMMARY OF THE INVENTIONS

Embodiments of the present invention provide a current control or driver circuit for discrete light sources such as solid states light source of which LED or OLED sub-pixels or pixels of an active matrix display are an example whereby there is a memory to store bits or a bit of a control signal used to drive a pixel or sub-pixel, as well as a method to drive said circuit. The light sources are driven by a control signal such as a Pulse Width Modulated signal of a certain bit-depth whereby the memory for storing the bits or bit of the PWM control signal, stores a lower number of bits than the bit-depth of the control signal such as the PWM signal.

An advantage of embodiments of the present invention is that the control circuit elements can be made compatible with thin-film processing such as to produce thin-film transistors.

Another advantage of embodiments of the present invention is that a control circuit or driving for controlling the light output of light sources such as LEDs or OLEDs advantageously does not impose a limitation to the resolution (or pixel pitch) of light sources of a LED or OLED display. This I because of the compact design. Yet another advantage of embodiments of the present invention is that the control circuit is fast enough to be compatible with a given frame rate and number of bits used to encode a PWM signal.

Hence, embodiments of the present invention provide a current control or drive circuit for light sources comprising LED or OLED pixels of an active matrix display. The components of the current control or drive circuit and how they are connected are shown particularly in FIGS. 14A, 14C, 15, and 17 and 22 to 27 In the current control or drive circuit:

A first storage element such as a capacitor or a capacitor circuit of which a Sample and Hold device with a capacitor is an example, is provided to control current in a light emitting element such as a LED or OLED of a subpixel or a pixel for use in an active matrix display. A capacitor, when it stores a value such as required for a bit in a one-bit memory, makes this value available to the circuit on one of its electrodes. Instead of a capacitor, other elements with the same function such as a bistable memory element can be used such as an unclocked Flip-Flop.

Further a memory element to store the next bit or bits of a control signal such as a PWM control signal is also provided. The number of bits stored in the memory element is less than the bit depth of the control signal such as the PWM control signal. The memory element is preferably a one-bit, two-bit or multibit clocked bistable element such as a clocked Flip-Flop or clocked Flip-Flops.

The driver circuit or current control circuit can also comprise:

a control element with a first control electrode, configured to control flow of current through the light emitting element such as the LED or OLED for a pixel or subpixel of an active display.

The control element can be a transistor such as a pMOS transistor and is preferably a thin film transistor. nMOS transistors can also be used or a combination of pMOS and nMOS transistors whereby the transistor or all the transistors may be and preferably are thin film transistors. The control electrode can be the gate of such a transistor or transistors. The light emitting element can be part of a pixel, a sub-pixel or a complete pixel. The current through the light emitting element can be controlled by the voltage placed on the gate of the transistor or transistors.

A second storage element can be a memory element provided to store a second value of the control signal. The second storage element can be a logic element such as a one-bit, two-bit or multibit memory provided the number of bits is less than the bit depth of the control signal such as the PWM signal. For example, the second storage element can be a capacitor in combination with a transistor or a clocked flip-flop or a device which has the same truth table as a flip-flop. Hence, generally it can be a clocked bistable element.

The current control or drive circuit can include a transfer element such as a switch. The transfer element or switch can be a transistor such as a pMOS transistor preferably a thin film transistor or it can be a transistor circuit configured to be a switch. An nMOS transistor or an nMOS transistor circuit or a combination of nMOS and PMOS transistors can be used.

The transfer element can have a second control electrode to load the first storage element with a second value of the control signal, wherein the number of bits stored by the first storage element and/or the second storage element is less than a bit-depth of a resolution of the control signal such as a PWM control signal.

An advantage of embodiments of the present invention is that the elements of the current control or drive circuit can be made in the same technology e.g. the storage elements such as any memory element is made in the same technology, as switches implemented as transistors connected to the light emitting element such as an LED or OLED. In particular this same technology can be thin-film processing (TFT). By these means, a compact design can be achieved.

Embodiments of the present invention provide a current control or driver circuit for discrete light sources such as solid-state light source of which LED or OLED sub-pixels or pixels are examples, e.g. of an active matrix display. The current control or driver circuit can comprise:

a memory to store bits or a bit of a control signal such as a PWM control signal used to drive a pixel or sub-pixel of the active matrix display, as well as a method to drive said circuit. The light sources can be driven by a Pulse Width Modulated control signal of a certain bit-depth whereby a memory of each pixel or sub-pixel for storing the bits or bit of the PWM control signal, stores a lower number of bits than the bit-depth of the PWM signal.

The current control or drive circuit can be adapted to load a next bit while a current bit is being used to control the current in a light source such as the LED or OLED, i.e. control of current therefore controls light output.

The memory can be a single bit memory to store just the next bit or can be multibit provided the number of bits is less than the bit depth of the control signal such as a PWM control signal. The active matrix display can include an array of pixels or sub-pixel light emitting elements arranged in rows and columns. The memory e.g. a clocked bistable device, can be part of a column wide shift register.

The length of time a control bit is used gives the width of a control signal sub-period such as a PWM sub-period associated to that bit. As explained below, for bits b-1 and b-2, it means that since T0 cannot be decreased, the value of the bit can be overridden by use of a reset signal. For b-1, the length of time is made T0/2 by overriding b-1 between time T0/2 until time T0, For b-2 the length of time is made T0/4 by overriding b-1 between time T0/4 and time T0 (the reset signal (RST signal) erases the bit b-1 or b-2 before the end of the interval T0).

In an embodiment of the present invention, a circuit to control the current in a Light Emitting Element such as an LED or OLED is provided that comprises:

a control element with a first control electrode, to control the flow of current through the light emitting element;

a first storage element to store a first value of a control signal, said control signal being applied to the first control electrode of the control element;

a second storage element to store a second value of a control signal;

a transfer element with a second control electrode to load the first storage element with the second value of the control signal.

In the circuit the control element, the first storage element, the second storage element and the transfer element such as a transistor can be realized with the same thin film transistor technology.

It is an advantage of that embodiment and other embodiments of the present invention that it is possible to load a second control voltage on the second storage element while the first control voltage is applied to the control electrode of the control element to control the current in the light emitting element. There is thus no "dead time" during which the light emitting element remains idle because no data is available to control it.

It is an advantage of embodiments of the present invention that it is possible to control the control element with an arbitrarily large number of sequential bits even though the second storage element can only store a limited number of bits at a time, e.g. one bit or two bits. In particular, the second storage element can store a number of bits which is less than the number of bits comprising the bit depth of the PWM signal used to drive the pixels.

More in particular, the second storage element stores a single bit or two bits or can be multibit storage element.

This is of particular importance when the current in the light emitting element is controlled by a pulse width modulation scheme (PWM), the required pulse width modulation being encoded as a string of bits that can be applied sequentially one at a time to the control electrode of the control element.

Limiting the size of the storage for the bits that are sequentially controlling the control element makes it possible to realize high density arrays of current control circuits, with a reduced pixel or sub-pixel pitch (i.e. the spatial period of the array of pixels or sub-pixels is reduced).

The first control element can be a switch that conditionally connects a current source with the light emitting element or. The first control element controls how current from the current source can reach the light emitting element. The first control element can be in series with the light emitting element or in parallel. When in parallel it bypasses the light emitting element which prevents the light emitting element from being driven on unless the first control element is open, i.e. non-conducting.

The first control element can be a transistor (e.g. a pMOS transistor) and the first control electrode can be the gate of said transistor or said pMOS transistor. This transistor such as the pMOS transistor can be a thin film transistor. nMOS transistors or pMOS or nMOS transistor circuits could be used.

The first storage element can be a capacitor with its first electrode connected to the first control electrode of the first control element and its second electrode connected to a reference node, in particular a supply node. A capacitor, when it stores a value such as when it acts to hold a bit in a one-bit memory, makes this value available to the circuit on one of its electrodes immediately. Instead of a capacitor, other elements with the same function such as a bistable memory element can be used such as an unclocked Flip-Flop.

The transfer element can be a transistor like a pMOS transistor. The transistor can be a thin film transistor such as a thin film pMOS transistor. nMOS transistors or pMOS or nMOS transistor circuits could be used.

The second storage element can be a capacitor and a transistor or another programmable memory such as a single or multibit memory such as a flip-flop or flip-flops. The second storage element is preferably clocked. The multibit memory can store a number of bits less than the bit depth of the control signal such as the PWM control signal.

In an alternative embodiment, the first storage element can be a programmable memory such as a single or multibit memory, e.g. a flip-flop or flip-flops as well. Such a flip-flop is preferably not clocked.

In another aspect of the invention, the control signal applied to the control electrode of the first control element by means of the first storage element, can be overridden.

Overriding the control signal stored on the first storage element can be done by means of a switch that conditionally connects the control electrode to an alternative control signal.

When the first storage element is a capacitor, the switch can be a reset switch that shunts the first storage element. The reset switch can alternatively shunt the light emitting element. The switch can be a transistor and in particular a pMOS transistor. This transistor or the pMOS transistors can be a thin film transistor.

In another embodiment of the present invention, a current control or drive circuit according to embodiments of the present invention is used to drive a display. The display can be e.g. a solid-state light source display such as a LED display or an OLED display.

Current control or drive circuits according to embodiments of the present invention and the light emitting element they drive can be disposed in lines and columns, i.e. in an array. Each of the L lines of the array has M current control or drive circuits and their associated light emitting elements.

A second storage element of each circuit in the same column (or line) can be connected to the same data signal line and a second storage element of each circuit in the same line (or column) can be connected to the same scan line. A signal applied to the scan line enables the storage of the signal present on the data signal line. The scan line can for instance control a switch that conditionally brings the data signal line and the second storage element in electrical contact.

Alternatively, the second storage element of each circuit in the same column (or line) can be part of a column wide (or line wide) shift register. The shift register can be realized with thin film transistors together with the thin film transistors of the current control circuit. It is an advantage of that aspect of the invention that it simplifies the routing of data and control signals to the current control circuits.

In another aspect of the invention, a method is provided to update the content of the second storage element while the content of the first storage element is used to control the current in the light emitting element. Each of the bits meant for the second storage element of a current control or drive circuit in the same column (or line) in an array of current control circuits can be applied sequentially to the input of a second storage element such as a one-bit, two-bit or multibit memory element such as a first flip flop in the column (or line) of current control circuits.

To update the second storage element of the current control or drive circuits in a column (or line), N bits are presented sequentially at the input of the column (or line) wide shift register and shifted through the shift register by clocking the shift register with a series of N first clock signals.

The content of the second storage element is then transferred to the first storage element.

It is an advantage of that aspect of the invention that the first storage elements of the current control or drive circuits in the same column (or line) are updated at the same time. Alternatively, the update is done for the entire array at the same time.

In yet another aspect of the invention, the shift registers of adjacent arrays are daisy chained.

An advantage of an aspect of the invention is that it simplifies the tiling of light emitting arrays as in tiled displays. In particular, no or little modification of the circuitry to control those arrays is necessary.

In another aspect of the invention, a method to drive the control circuit of a light emitting element involves the step of:

Transferring a control signal from a second storage element to a first storage element Controlling the current in the light emitting element in function of said control signal, whereby the control signal is stored on a first storage element Loading the second storage element with another control signal while the current in the light emitting element is controlled by the previous control signal.

In another aspect of the invention, a method is provided to modulate the current in a Light Emitting Element in function of N1 bits+N2 bits, the N2 bits having less weight than the N1 bits; the method comprising the steps:

For each of the $N_1$ bits, the current in the light emitting element is controlled by said $N_1$ bits, one at a time and during a time interval with a duration of at least $T_{Min}$;

For each of the $N_2$ bits, the current in the light emitting element is controlled by said $N_2$ bits, one at a time and during a first time interval that is less than $T_{Min}$ and overriding said one of the N2 bits during a second time interval that is less than $T_{Min}$ the sum of the duration of the first time interval and the second time interval being equal to $T_{Min}$.

It is an advantage of that aspect of the invention that the total number of bits N=N1+N2 can be modified (and in particular increased) without having to modify the duration $T_{Min}$.

The N1+N2 bits can encode the amplitude of the current in the light emitting element.

The current can for instance be Pulse Width Modulated, in which case, the N1+N2 bits can encode the duty cycle of the PWM signal that will determine the average value of the current during a period T of the PWM signal.

The duty cycle can be encoded with N=N1+N2 bits with N1≥1 and N2≥0. N2 is preferably smaller than N1 in order to limit a non-linearity or an error between the bit code (i.e. the integer number represented by the bits N1+N2) and the average current circulating in a light emitting element such as a light emitting diode, the average being computed over a period T of the PWM signal.

The duration $T_{Min}$ of the time interval can be the duration of the current pulse (within the PWM period) corresponding to the PWM Sub-Period of the bits with the least weight among the N1 bits. The entire sequence of bits can control the current during a time interval equal to $(2^{N_1}-1)*T_{Min}+N2*T_{Min}$ after which the current in the light emitting element can be controlled/determined by another sequence of bits.

It is an advantage of the invention that it can limit the number of electrical tracks to carry signals to a light emitting element and its current controlling circuit in an array of light emitting elements.

The bits can for instance be shifted through a column-wide or line-wide shift register in an array of C column and L line of light emitting elements. The time required to shift a bit from the input of the shift register to its end can determine the time interval $T_{Min}$.

BRIEF DESCRIPTION OF THE FIGURES

These and other technical aspects and advantages of embodiments of the present invention will now be described in more detail with reference to the accompanying drawings, in which:

FIG. 9 shows an example of PWM signal encoded on 4 bits with $b_0=0$, $b_1=0$, $b_2=0$ and $b_3=1$ and for which the time period for $b_3$ is uninterrupted. The time period for $b_3$ is 8 times as long as the time period $T_0$ for bit $b_0$.

FIG. 10 shows an example of PWM signal encoded on 4 bits with $b_0=0$, $b_1=0$, $b_2=0$ and $b_3=1$ and for which the time period for b3 is split as evenly as possible across the PWM period T. The pulse b; has been split into 8 sub-pulses $b_{31}$, $b_{32}$, $b_{33}$, $b_{34}$, $b_{35}$, $b_{36}$, $b_{37}$ and $b_{38}$. Each of the sub-pulses has a duration $T_0$ equal to the duration of the bit $b_0$ and the sum of the duration of the sub-pulses is equal to the duration $T_3=T_0*2^3$.

Figure 11:
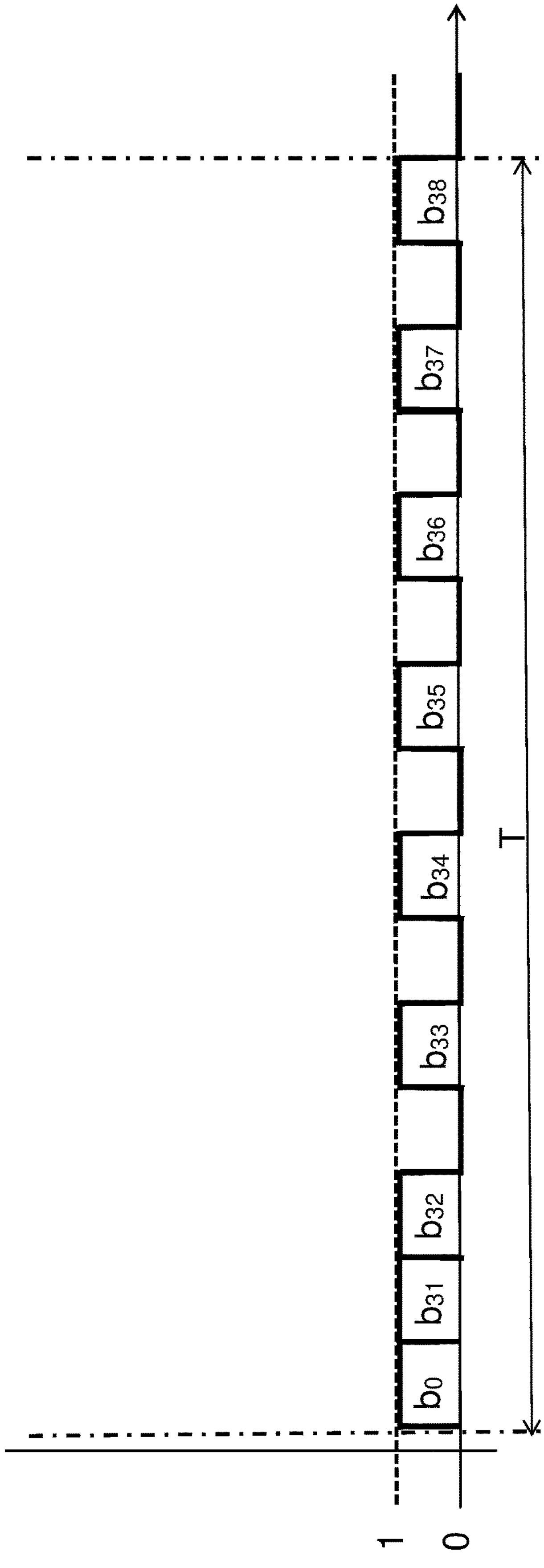
FIG. 11 shows an example of PWM signal encoded on 4 bits with $b_0=1$, $b_1=0$, $b_2=0$ and $b_3=1$ and for which the time period for $b_0$ and $b_3$ are split and distributed as evenly as possible across the PWM period T.
Figure 12:
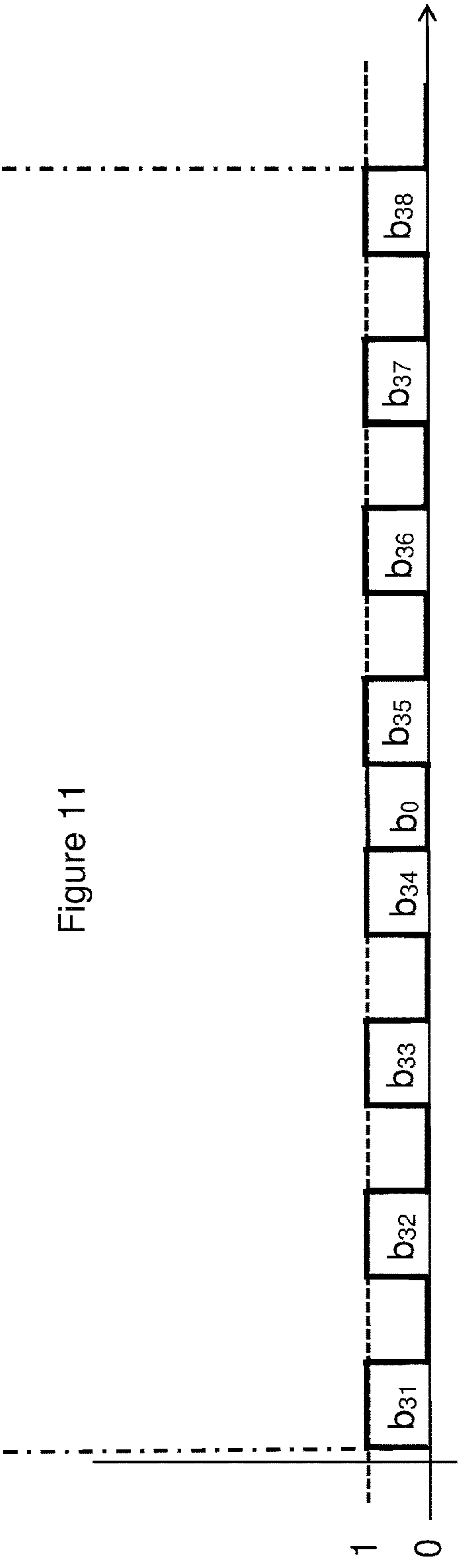
FIG. 12 shows the PWM signal encoded on 4 bits with $b_0=1$, $b_1=0$, $b_2=0$ and $b_3=1$ with a different distribution of the sub-pulses $b_{31}$, $b_{32}$, $b_{33}$, $b_{34}$, $b_{35}$, $b_{36}$, $b_{37}$ and $b_{38}$ and $b_0$.

The duty cycle D is the same for both FIGS. 11 and 12.

Figure 13:
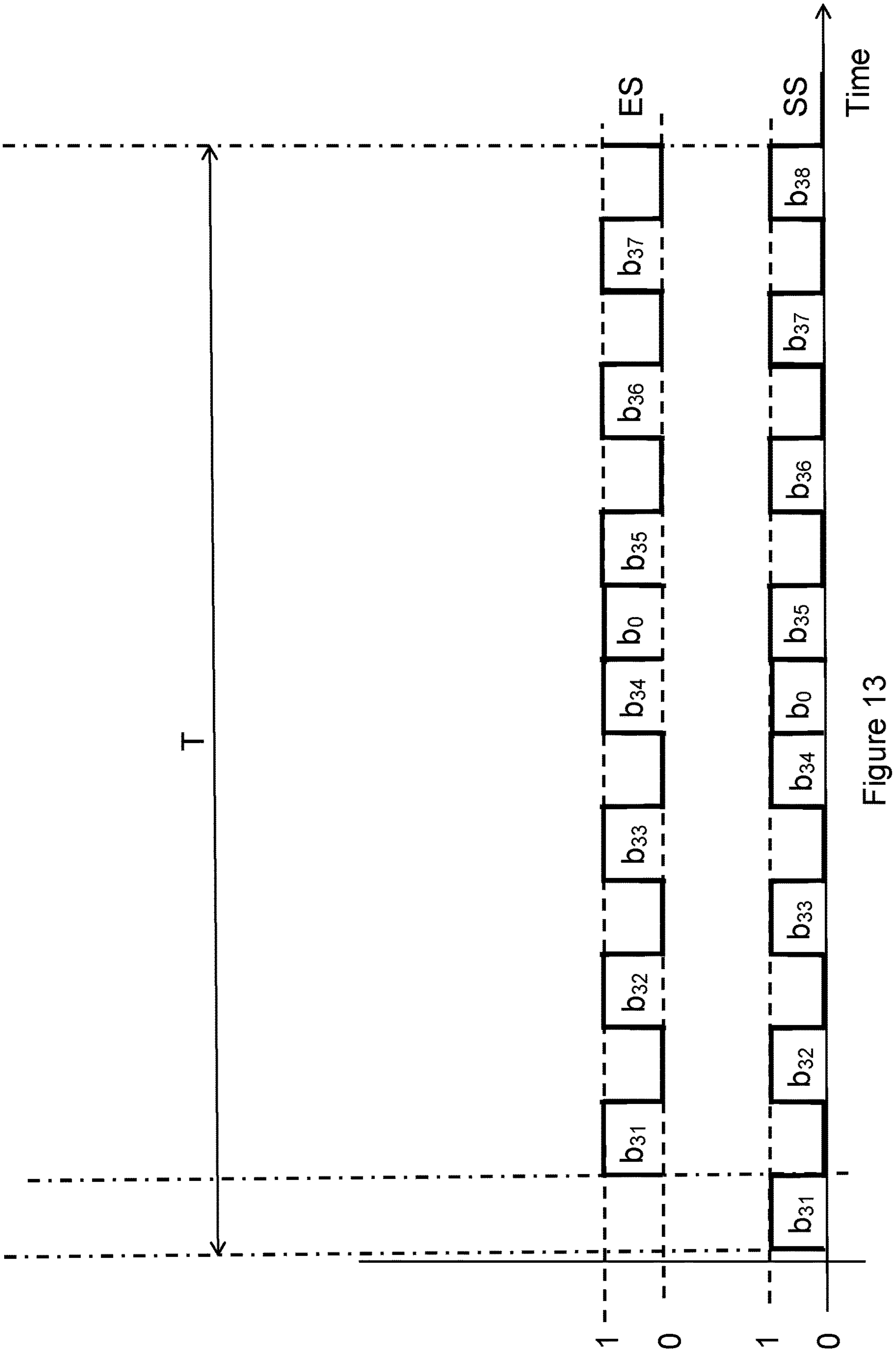

FIG. 13 shows the enabled signal ES (Di in Table 1) that drives a Led at a given moment in time and the stored signal SS (Pi in Table 1) that is stored at a given moment in time and that will drive the LED during the next bitblock.

Figure 14A:
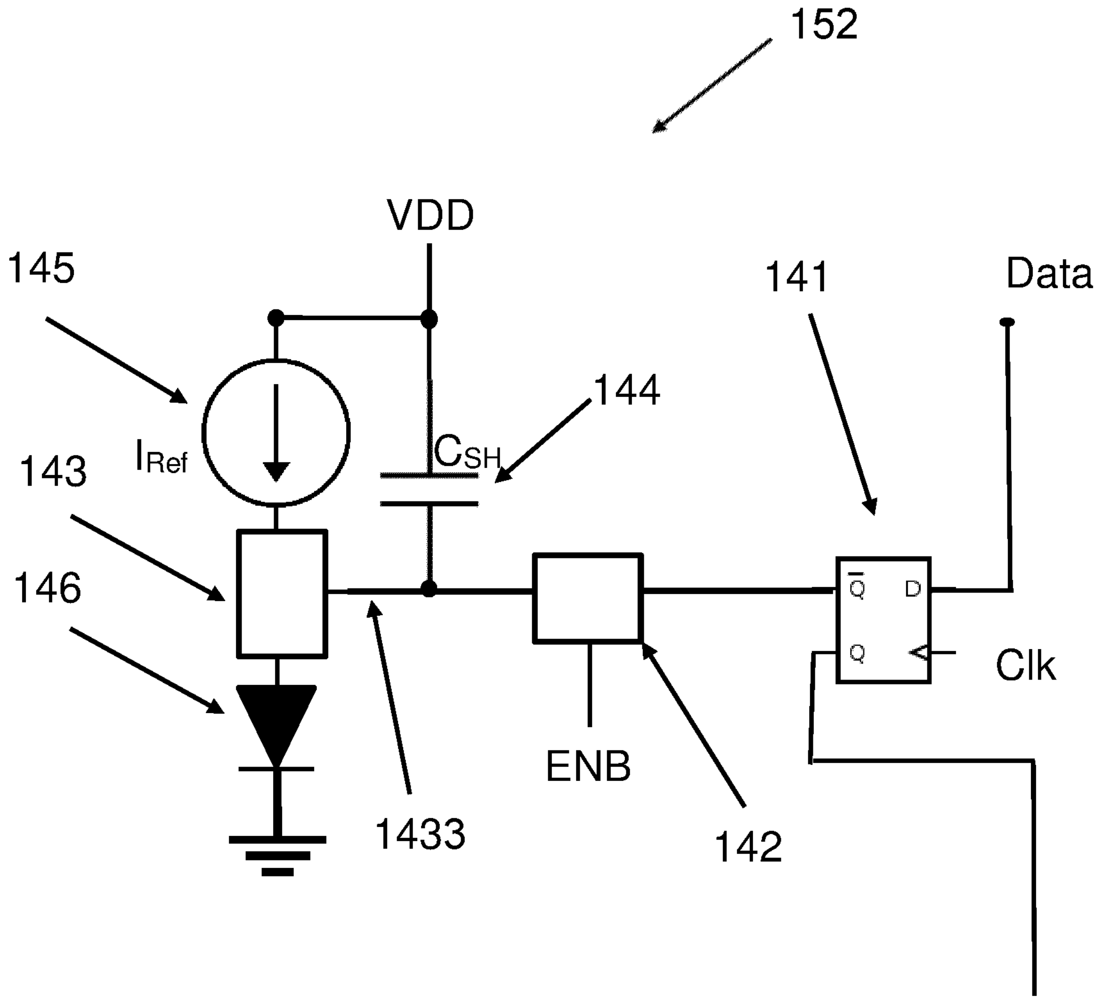

FIG. 14A shows an example of current control circuit according to an embodiment of the present invention.

Figure 14B:
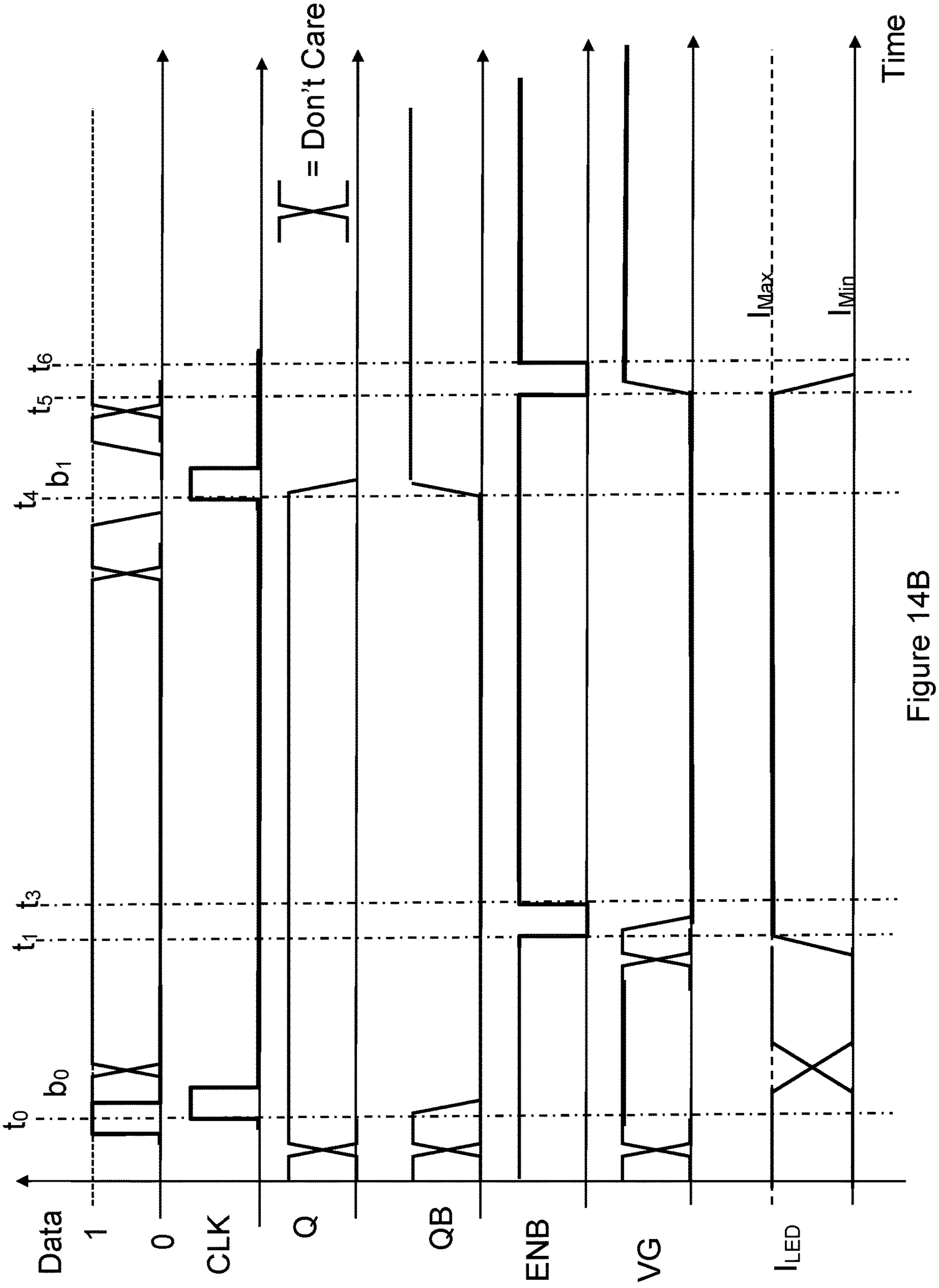

FIG. 14B shows the state of signals at nodes of the circuit of FIG. 14A in function of time.

Figure 14C:
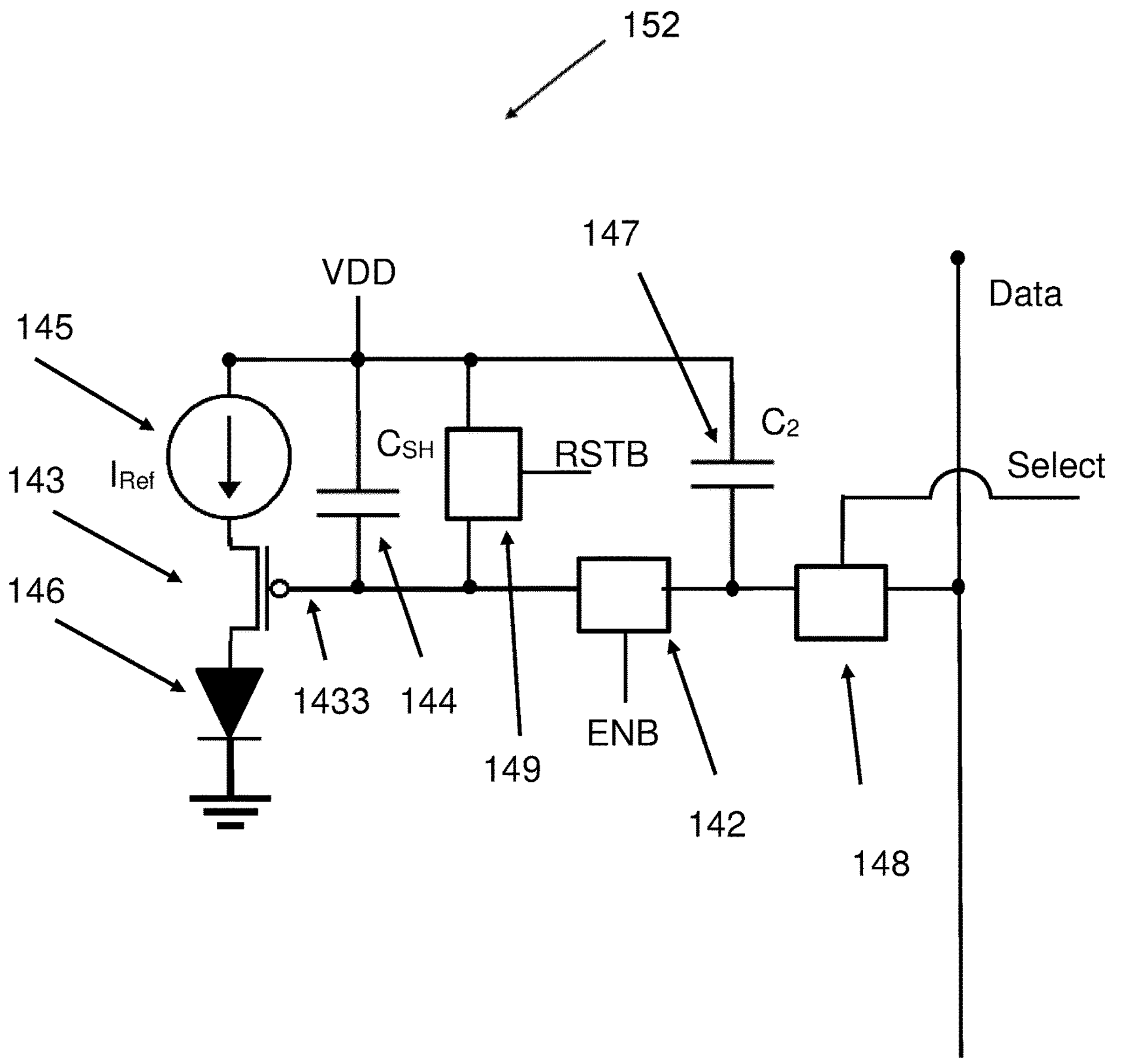

FIG. 14C shows another example of current control circuit according to an embodiment of the present invention.

Figure 15:
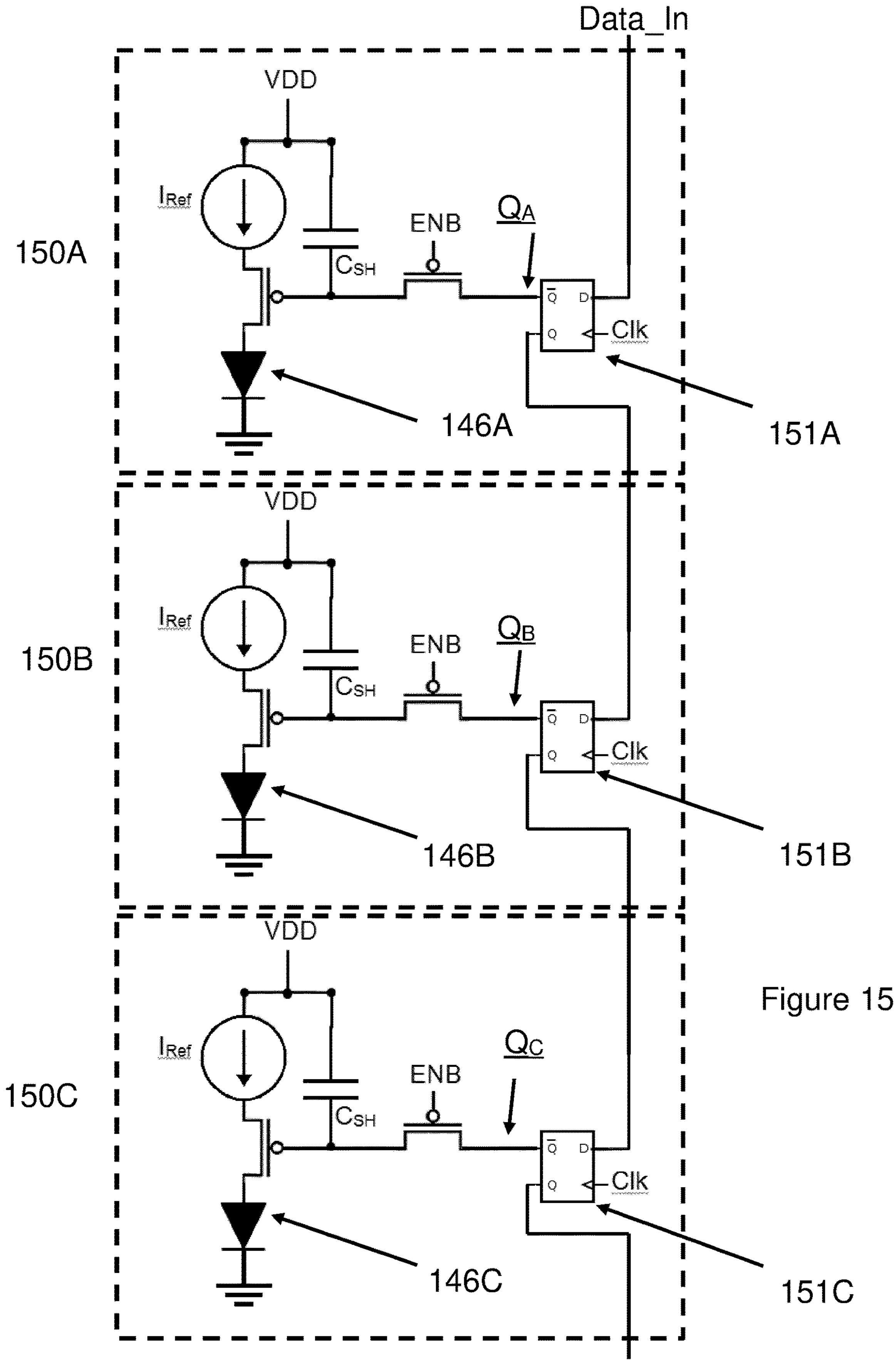

FIG. 15 shows how the second storage element of adjacent current control circuit can be daisy chained to form a shift register according to an embodiment of the present invention.

Figure 16:
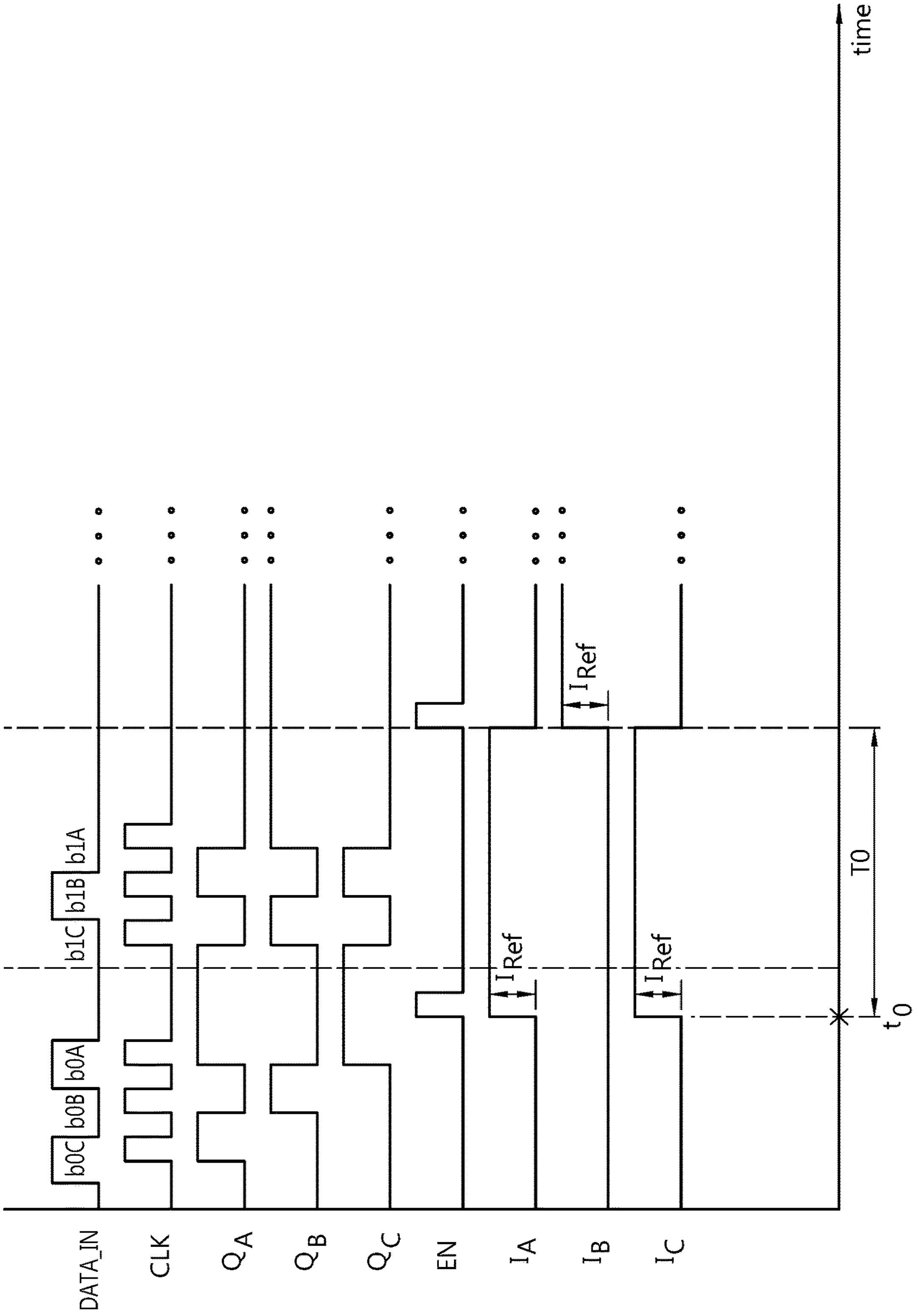

FIG. 16 illustrates how bits are sent and stored while the solid state light sources such as OLEDs or LEDs are emitting light according to information encoded in bits previously stored in the memory elements of each pixels or sub-pixels according to an embodiment of the present invention.

Figure 17:
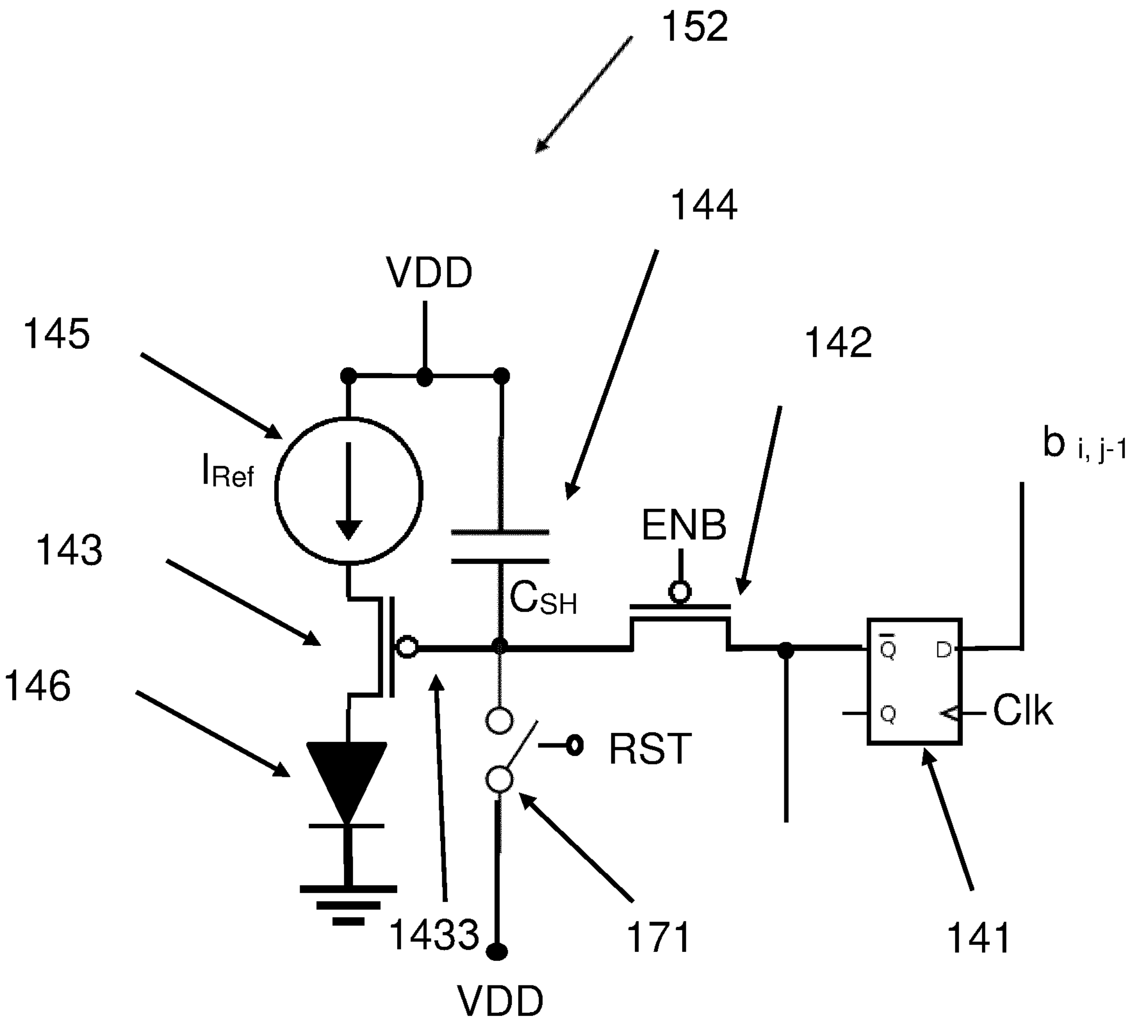

FIG. 17 shows a reset switch connected in parallel with the capacitor $C_{SH}$ 17, the switch is closed before the end of the time interval $T_0$ according to an embodiment of the present invention.

Figure 18:
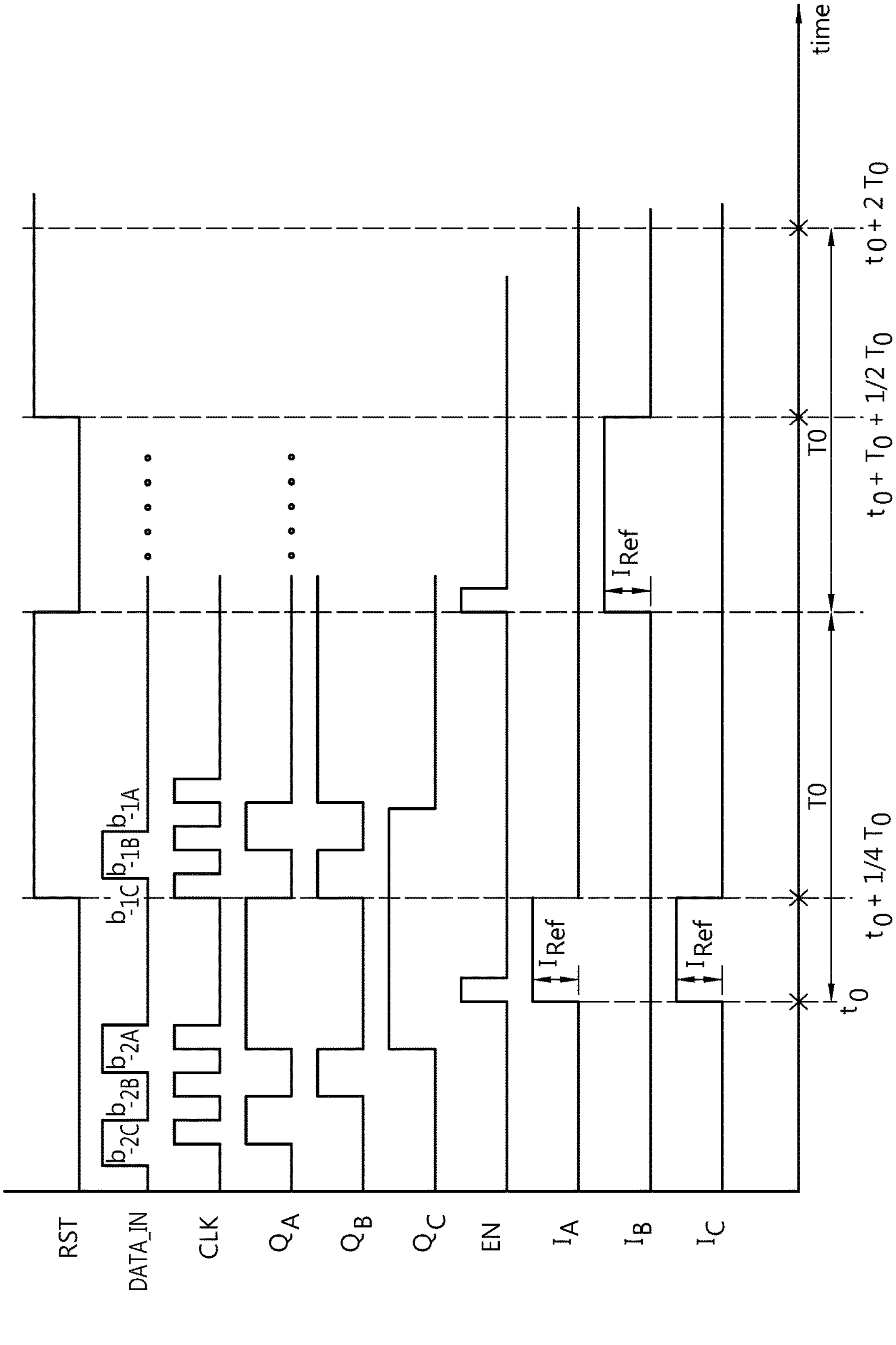

FIG. 18 illustrates how the RST signal can be used to enable a higher bit depth according to an embodiment of the present invention.

Figure 19:
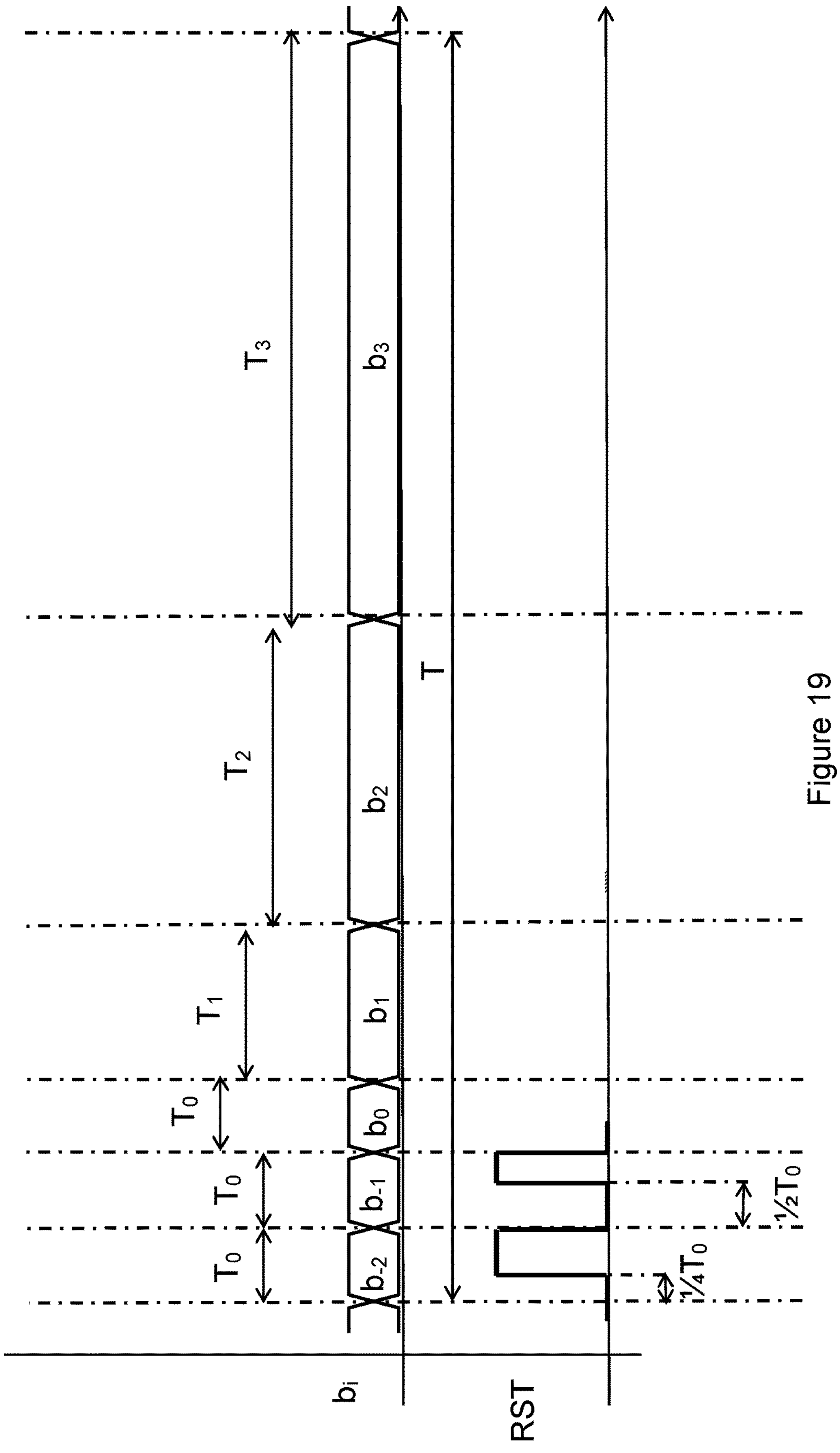

FIG. 19 shows for an example with (N1=4 and N2=2) how the reset signal RST varies in function of time and in function of the PWM sub-period (for each bit $b_i$) according to an embodiment of the present invention.

Figure 20:
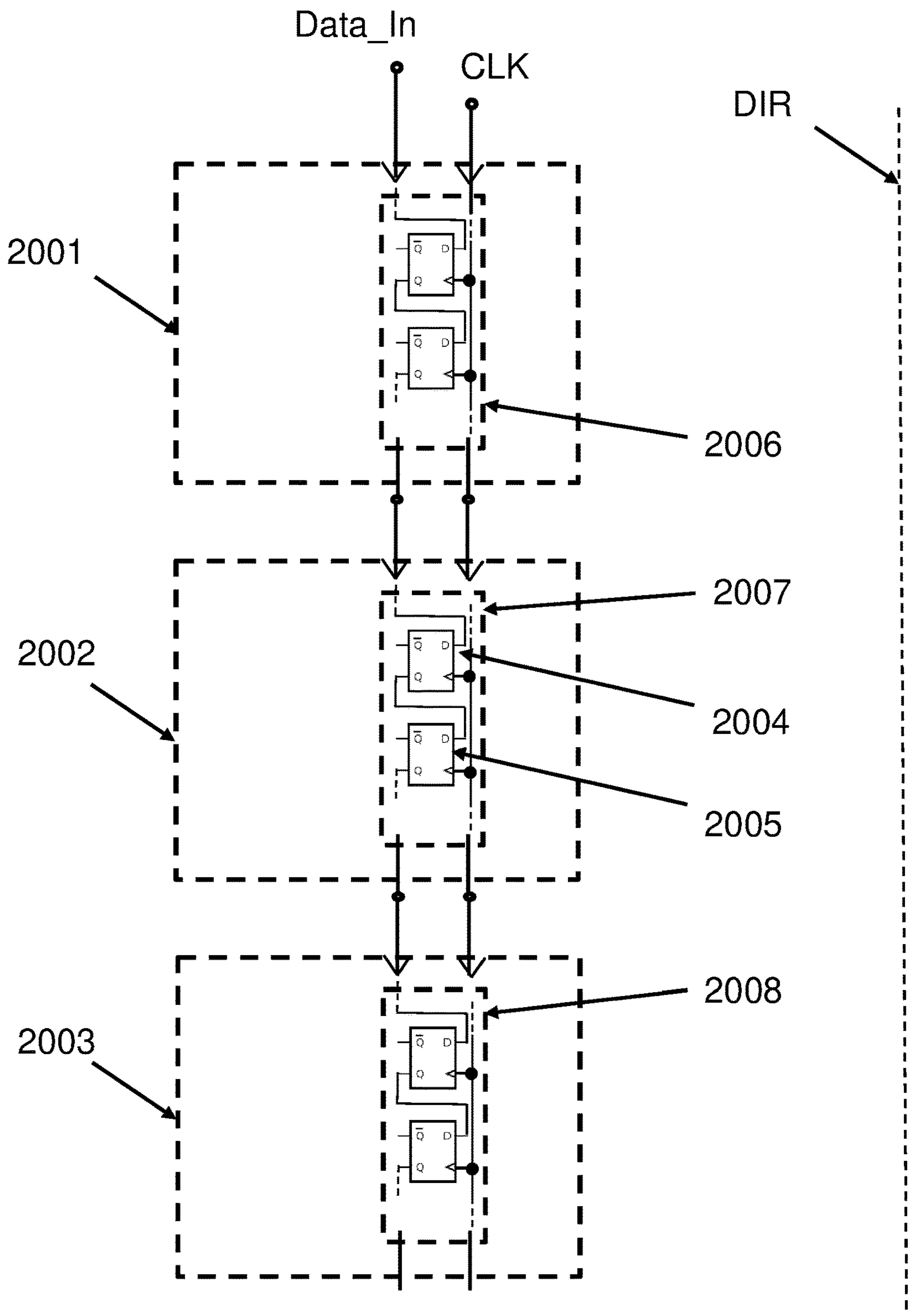

FIG. 20 illustrates how embodiments of the present invention address the problem of connecting different substrates.

Figure 21:
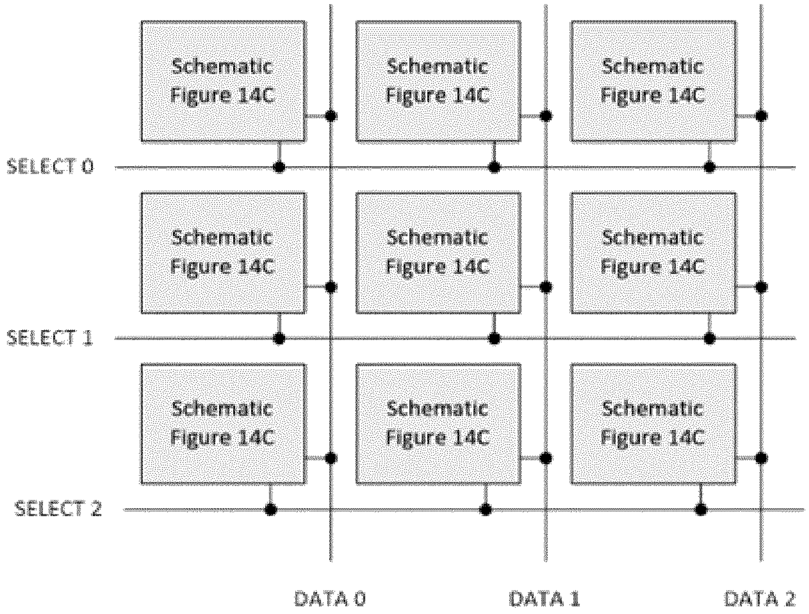

FIG. 21 illustrates how to upload data to an active display.

Figure 22:
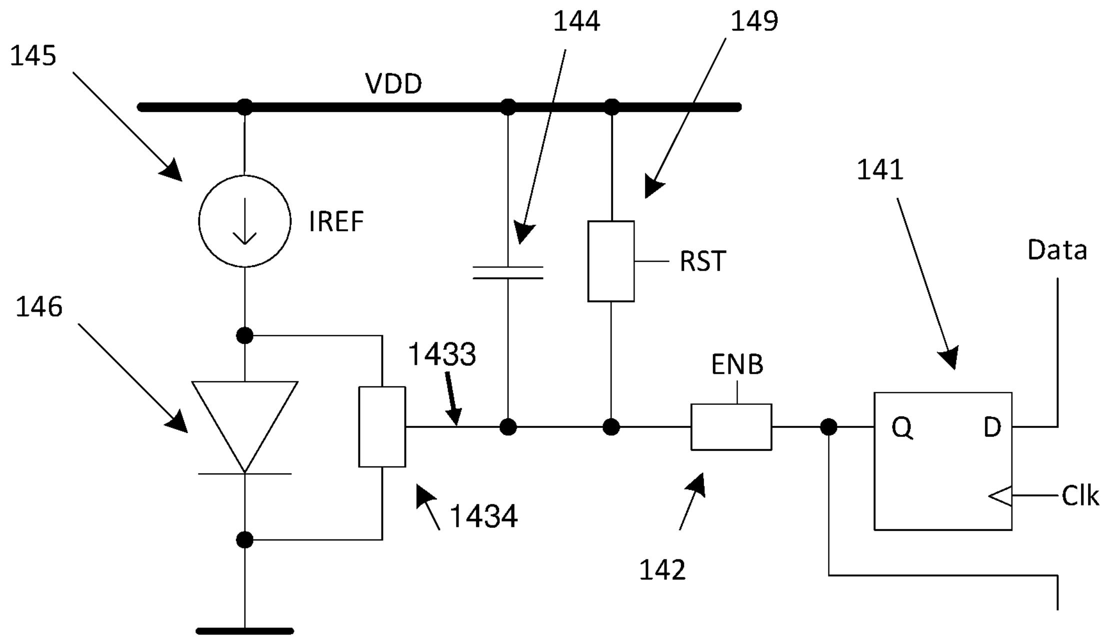

FIG. 22 shows an alternative arrangement of the control element 1434 e.g. a transistor according to an embodiment of the present invention.

Figure 23:
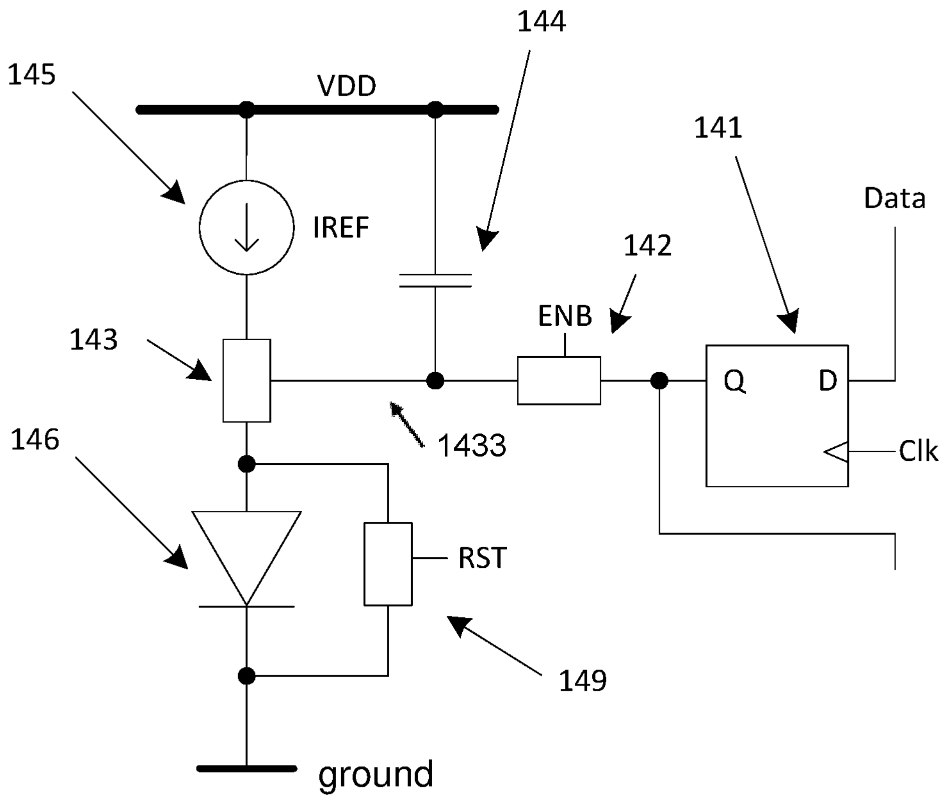

FIG. 23 shows an alternative arrangement of the reset element RST e.g. a transistor according to an embodiment of the present invention.

Figure 24:
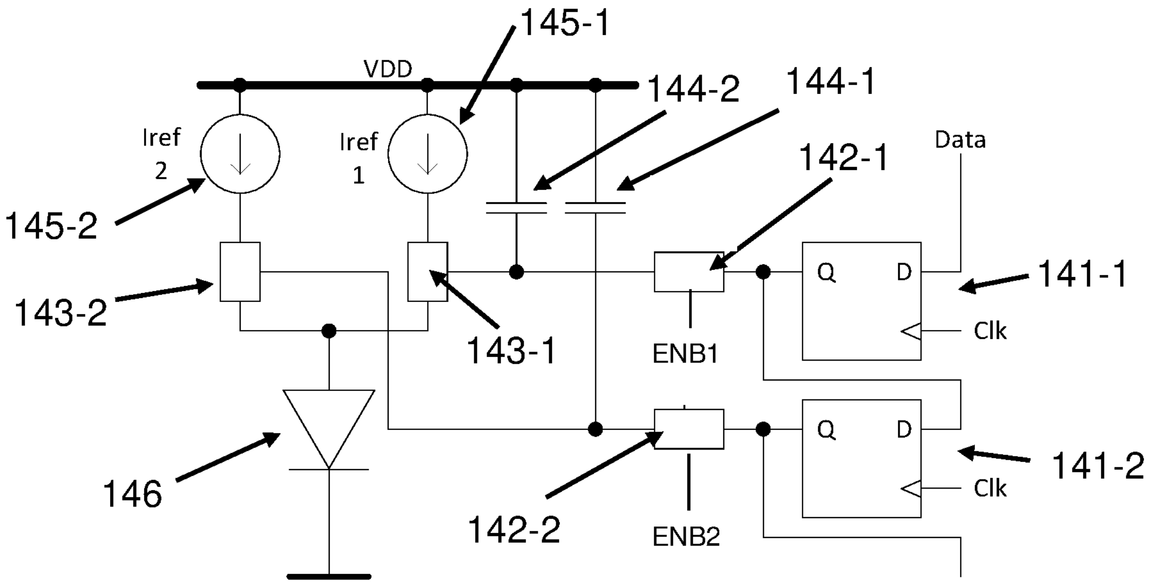

FIG. 24 shows a multibit (two-bit) circuit based on a duplication of the current control circuit of FIG. 14A according to a further embodiment of the present invention.

Figure 25:
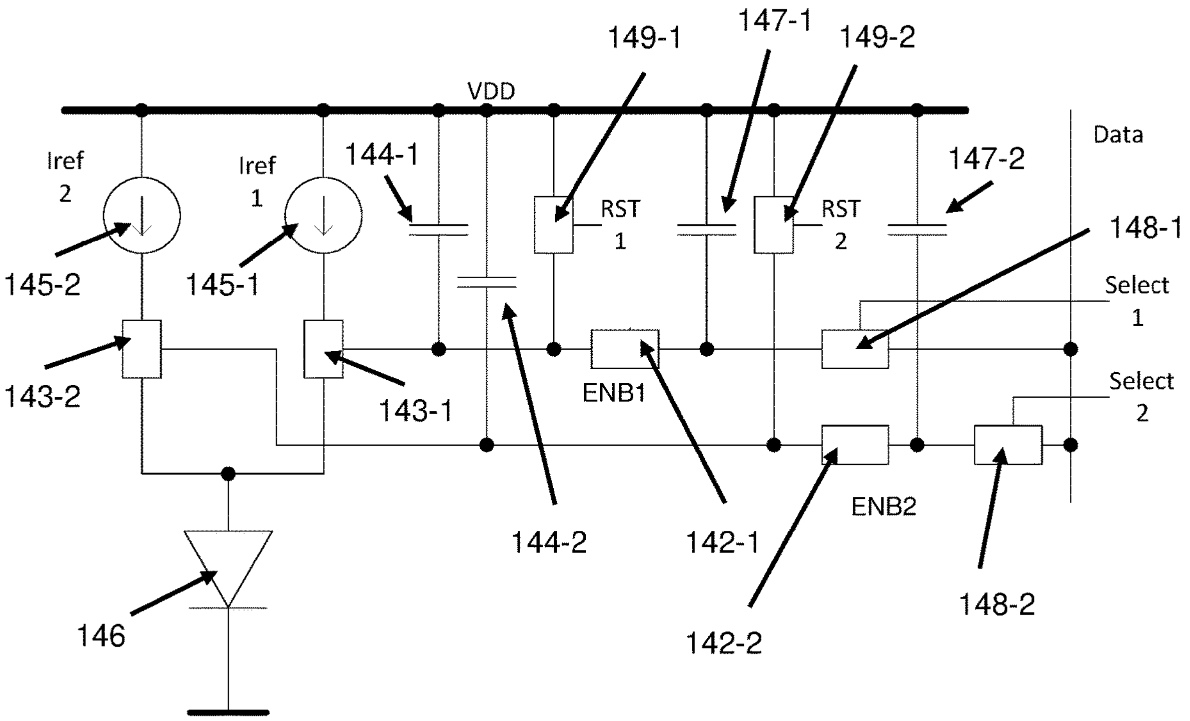

FIG. 25 shows a multibit (two-bit) circuit based on a duplication of the current control circuit of FIG. 14C according to a further embodiment of the present invention.

Figure 26:
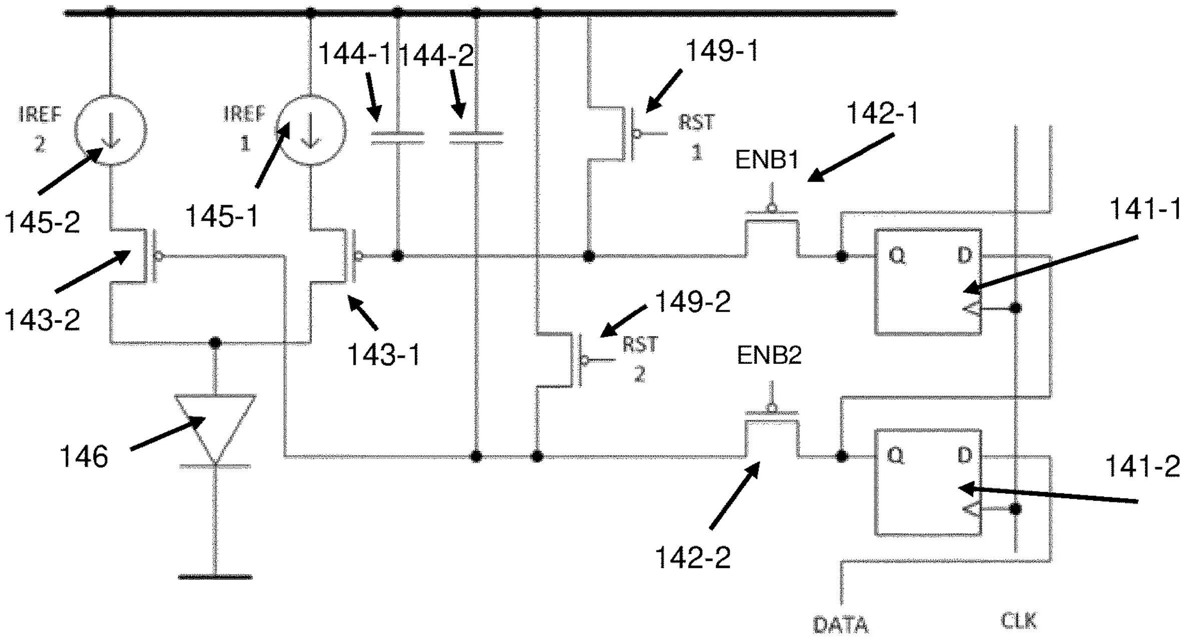
Figure 27:
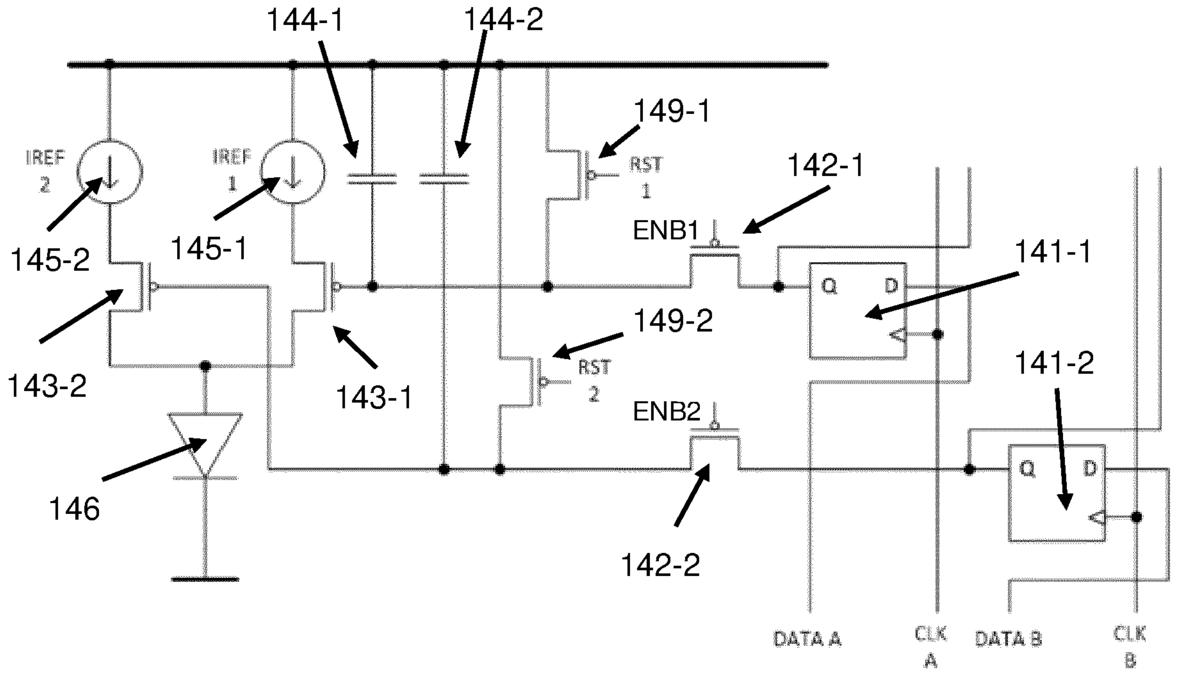

FIGS. 26 and 27 show a multibit (two-bit) current control or driving circuit based on a duplication of the current control circuit of FIG. 14C in amended form according to a further embodiment of the present invention.

DEFINITIONS AND ACRONYMS

Active Matrix. Active matrix is a type of addressing scheme used in flat panel displays. In this method of switching individual elements (pixels), each pixel is attached to a switch such as a transistor and a capacitor actively maintaining the pixel state while other pixels are being addressed. An example of schematic of a pixel in an active matrix is given on FIG. 1.

Figure 3:
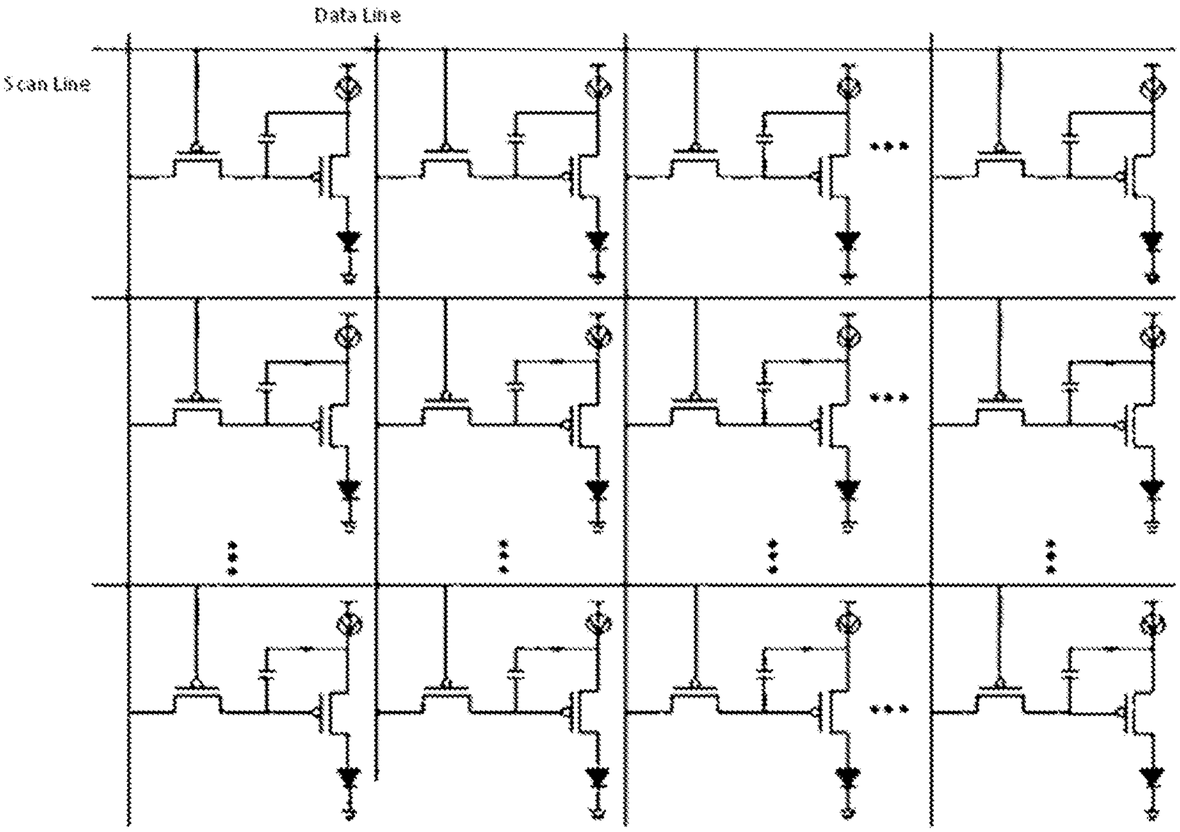
FIG. 3 shows an active matrix LED array according to the art.

Active-matrix circuits are commonly constructed with thin-film transistors (TFTs) in a semiconductor layer formed over a display substrate and employing a separate TFT circuit to control each light-emitting pixel in the display. The semiconductor layer is typically amorphous silicon or poly-crystalline silicon and is distributed over the entire flat-panel display substrate. FIG. 3 shows a schematic representation of an active matrix. An active matrix display ca also be for example an LCD or an electrophoretic reflective transmissive emitting display or similar.

A display sub-pixel can be controlled by one control element, and each control element includes at least one transistor. For example, in a simple active-matrix light-emitting diode display, each control element includes two transistors (a select transistor and a power transistor) and one capacitor for storing a charge specifying the luminance of the sub-pixel. Each LED element employs an independent control electrode connected to the power transistor and a common electrode. Control of the light-emitting elements in an active matrix known to the art is usually provided through a data signal line, a select signal line, a power or supply connection (referred to as e.g. VDD) and a ground connection.

Critical Flicker Frequency. The highest possible frequency at which flicker is seen when contrast is maximum is the Critical Flicker Frequency (or CFF). The critical flicker frequency is function of several factors like e.g. the luminance. For humans, the lower the luminance, the less sensitive to flicker they are.

Duty Cycle. A duty cycle is the fraction of one period in which a signal or system is active. Duty cycle is commonly expressed as a percentage or a ratio. Thus, a 60% duty cycle means the signal is on 60% of the time but off 40% of the time. In a PWM current control circuit, the duty cycle can represent the fraction of the time that current flows in e.g. a light emitting element.

Flicker. Flicker is a visible fading or decrease in brightness between two successive frames or more generally cycles (like e.g. two successive period of a PWM signal).

Programmable Memories Such as a Flip-Flop.

Embodiments of the present invention make use of a storage element, e.g. one-bit programmable memory such as a flip-flop or a transistor with a select line or a capacitor, e.g. a sample and hold device or a multibit memory. The programmable memory can be clocked in some embodiments.

The embodiments of the present invention can be used with a PWM scheme for driving pixels and/or sub-pixels of a display, e.g. an active display. One-bit programmable memory elements can be used such as a flip flop e.g. a clocked flip-flop or a capacitor or capacitive circuit such as a sample and hold capacitor. Multibit programmable memories can be provided by multiples of one-bit or a multibit memory.

An example of truth tables of a clocked programmable memory is:

| Clock | D | $Q_{next}$ |
|---|---|---|
| Rising edge | 0 | 0 |
| Rising edge | 1 | 1 |
| Non-Rising | X | Q |

"X" denotes a Don't care condition, meaning the signal is irrelevant, or a programmable memory having the truth table:

| Inputs | | | | Outputs | |
|---|---|---|---|---|---|
| S | R | D | > | Q | Q' |
| 0 | 1 | X | X | 0 | 1 |
| 1 | 0 | X | X | 1 | 0 |
| 1 | 1 | X | X | 1 | 1 |

These are memories with a NAND and a NOR port. A flip-flop is a programmable memory element. Flip-flops can be clocked or unclocked, e.g. clocked or unclocked programmable elements. For unclocked programmable elements or unclocked flip-flops, the output reacts directly with the input. For clocked programmable elements or clocked flip-flops the input is only transferred to the output after a timing pulse or part of a pulse.

In particular, a D Flip Flop is shown as follows.

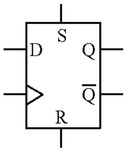

D flip-flop symbol

The D flip-flop is widely used. It is also known as a “data” or “delay” flip-flop. The D flip-flop captures the value of the D-input at a definite portion of the clock cycle (such as the rising edge of the clock). That captured value becomes the Q output. At other times, the output Q does not change. The D flip-flop can be viewed as a memory cell. In particular, a D-flip-flop can be a programmable memory element. A D-flip-flop can be a clocked programmable memory element.

The truth table of the D flip flop or any programmable memory element functioning as a D flip-flop is as follows:

| Clock | D | $Q_{next}$ |
|---|---|---|
| Rising edge | 0 | 0 |
| Rising edge | 1 | 1 |
| Non-Rising | X | Q |

“X” denotes a Don’t care condition, meaning the signal is irrelevant.

Most D-type flip-flops, e.g. in integrated circuits, have the capability to be forced to the set or reset state (which ignores the D and clock inputs), much like an SR flip-flop. In embodiments where a Flip-Flop is used as a memory element, a clocked D-FF, JK-FF & SR-FF can be used. Embodiments of the present invention can make use of a clocked shift register with Flip-Flops.

Usually, the illegal S=R=1 condition is resolved in D-type flip-flops. By setting S=R=0, the flip-flop can be used as described above.

Here is the truth table for the other S and R possible configurations

| Inputs | | | | Outputs | |
|---|---|---|---|---|---|
| S | R | D | > | Q | Q' |
| 0 | 1 | X | X | 0 | 1 |
| 1 | 0 | X | X | 1 | 0 |
| 1 | 1 | X | X | 1 | 1 |

In the present application if a B is used as in QB the B means an inverting output. FPGA. Field programmable gate array. An electronic device that can be used to generate the signals required to operate a display and in particular a LED, matrix display. An FPGA can be used as a controller for example. Examples of how an FPGA can be used in LED display can be found in e.g. U.S. Pat. No. 7,450,085B2 “Intelligent lighting module and method of operation of such an intelligent lighting module”.

FPS or fps. Frames per second. The number of frames displayed per second on a LED display or a LED display tile. Frames per second or fps is a unit that measures display device performance. It consists of the number of complete scans of the display screen that occur each second. This is the number of times the image on the screen is refreshed each second, or the rate at which an imaging device produces unique sequential images called frames.

Frame. A frame is one picture of e.g. a series of pictures that makes a sequence of film or animated movie or video. It can also mean a complete image for display (as on a display or a tile of a tiled display). In some contexts, a frame can also mean the time interval during which a frame is displayed. This is better described as “frame time” typically $1/60^{th}$ of a second.

Thin-film technology refers to the use of thin films: A film a few molecules thick deposited on a glass, ceramic, or semiconductor substrate to form a capacitor, resistor, coil, cryotron, or other circuit component. A film of a material from one to several hundred molecules thick deposited on a solid substrate such as glass or ceramic or as a layer on a supporting liquid.

Thin-film Integrated circuit: An integrated circuit consisting entirely of thin films deposited in a patterned relationship on a substrate. The substrate does not have to be a semiconductor but glass, quartz, diamond or polyimide are more often used.

Thin-film transistor: A field-effect transistor constructed entirely by thin-film techniques, for use in thin-film circuits. Abbreviated TFT.

| Reference number | Component | Preferred embodiment | Preferred technology used |
|---|---|---|---|
| 141 | Second storage element | Programmable memory element such as a flip-flop, e.g. a one-bit memory cell like e.g. a D-flip-flop or a two-bit memory or a multibit memory provided the number of bits is less than the bit depth of the control circuit. The programmable element is clocked in some embodiments | TFT |
| 142 | Transfer element or switch | A switch such as a transistor e.g. a pMOS transistor particularly a thin film transistor and/or a transistor circuit configured as a switch. | TFT |
| 143 | Control element | Can be a Transistor, such as a pMOS transistor and a first control electrode can be the gate of the transistor. The transistor is operatively connected with a light source such as a LED or OLED and operatively connected with at least one current source 145 | TFT |
| 1433 | Control electrode of the control element | Gate of a transistor, whereby the transistor can be a pMOS transistor, e.g. a TFT transistor | TFT |
| 144 | First storage element | A capacitor or a flip-flop or a capacitive circuit such as a sample and hold device having a storage element such as a sample and hold capacitor. This element does not need to be clcoked | TFT |
| 145 | Current source | | TFT |
| 146 | Light source such as a Light emitting element | Light emitting element can be a diode such as an OLED or LED, e.g. of a pixel or sub-pixel | uLED |

-continued

| Reference number | Component | Preferred embodiment | Preferred technology used |
|---|---|---|---|
| 147 | Second storage element - alternative embodiment | For example, a capacitor or capacitive circuit such as a sample and hold device or a circuit comprising an unclocked flip-flop | TFT |
| 148 | Loading device | Loading transistor such as a pMOS transistor, e.g. a pass gate in combination with item 147 | TFT |
| 149 | Reset element | Can be a Reset switch such as a reset transistor | TFT |
| 150 | Pixel or sub-pixel | | uLED + TFT |
| 151 | Second storage element - alternative embodiment | Programmable memory element e.g. a one-bit or multibit memory such as can be provided by a flip-flop or a flip-flop circuit. The number of bits is less than the bit depth of a control signal such as a PWM signal. The programmable memory element can be clocked. | TFT |
| 152 | Driver circuit | e.g. for a solid-state light source 146 | |
| 153 | Current control circuit | e.g. for a solid-state light source 146 | |
| 171 | Reset element - alternative embodiment | Reset switch | |
| D | Duty cycle | duty cycle is the duration of a pulse P (i.e. the time during which the signal is at its higher limit $I_1$) is D/100 * T (if D is expressed in %). For instance if D = 50%, the duration of the pulse is ½ T. | |

LED. Light Emitting Diode.

OLED. Organic Light Emitting Diode.

LED display.

The following patent applications, from the same applicant, provide definitions of LED displays and related terms. These are hereby incorporated by reference for the definitions of those terms.

U.S. Pat. No. 7,972,032B2 "LED Assembly".

U.S. Pat. No. 7,176,861B2 "Pixel structure with optimized subpixel sizes for emissive displays"

U.S. Pat. No. 7,450,085 "Intelligent lighting module and method of operation of such an intelligent lighting module".

U.S. Pat. No. 7,071,894 "Method of and device for displaying images on a display device".

LSB. Least Significant Bit. If a number is encoded with e.g. four bits such that number=$b_0+b_1*2+b_2*2^2+b_3*2^3$ then $b_0$ is the LSB or least significant bit.

Luminance (L). The luminous intensity per unit area projected in a given direction. The SI unit is the candela per square meter, which is still sometimes called a nit. Luminance and brightness have often been used interchangeably in the literature even though luminance and brightness are not one and the same thing. Here, whenever "brightness" is used, the inventors mean "luminance".

MSB. Most Significant Bit. If a number is encoded with e.g. four bits such that the number=$b_0+b_1*2+b_2*2^2+b_3*2^3$ then $b_3$ is the MSB or most significant bit. MSB can also be used for more than one bit, for instance the four bits $b_0$, $b_1$, $b_2$ and $b_3$ can be split in two groups. The first two bits $b_0$ and $b_1$ can be referred to as the least significant bits of the group of four bits. The last two bits $b_2$ and $b_3$ can be referred to as the most significant bits of the group of four bits.

Pitch. Distance between the center of two adjacent pixels (or sub-pixels of the same color) in an array of pixels (or sub-pixels). Also known as spatial period of the array of pixels (or sub-pixels).

Pixel. The one or more light sources used to render a picture element. A pixel can be a unit of an image=picture element. It can be a physical structure of a display which emits light depending upon context. A pixel can include sub-pixels. One or more sub-pixels may emit light of one colour. The sub-pixels can be addressed individually.

pMOS. Sometimes called a pMOSFET; p-type Metal-Oxide-Semiconductor Field Effect Transistor.

Light Emitting Element. A light emitting element can be e.g. a solid-state light emitting element, such as a light emitting diode such as an LED or an OLED (Organic LED).

PWM (Pulse-Width Modulation).

Figure 4:
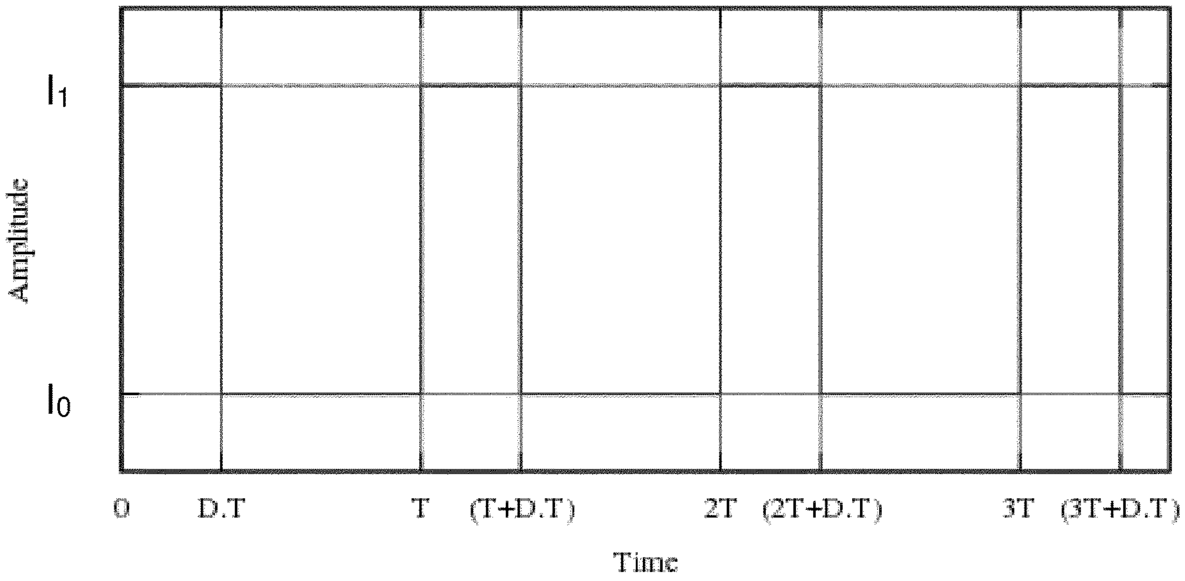
FIG. 4 shows an example of a rectangular pulse wave as can be used with pulse-width modulation. The pulse width of a rectangular pulse wave is modulated resulting in the variation of the average value of the waveform.

Pulse width modulation (PWM) schemes control luminance by varying the time during which a constant current is supplied to a light emitting element such as a light emitting diode. Pulse-width modulation uses a rectangular pulse wave whose pulse width is modulated resulting in the variation of the average value of the waveform. FIG. 4 shows an example of such a rectangular pulse wave.

The control signal of a PWM scheme has a bit depth. This is mostly the case in digital systems. Starting from a single pulse and the pulse width is to be controlled with a digital system, the pulse width will follow a binary pattern. The more bits, the more accurate the pulse width will be. In embodiments of the present invention a single pulse can be split up timewise across one frame. This split can be done in a binary way. The more bits the control system has, the smaller the PWM pulse, and the more accurate a value can be displayed.

The square wave has a period T, a lower limit $I_0$ (typically, $I_0=0$), a higher limit $I_1$ and a duty cycle D. The duration of a pulse P (the time during which the signal is at its higher limit $I_1$) is D/100*T (if D is expressed in %). For instance if D=50%, the duration of the pulse is ½ T.

Figure 5:
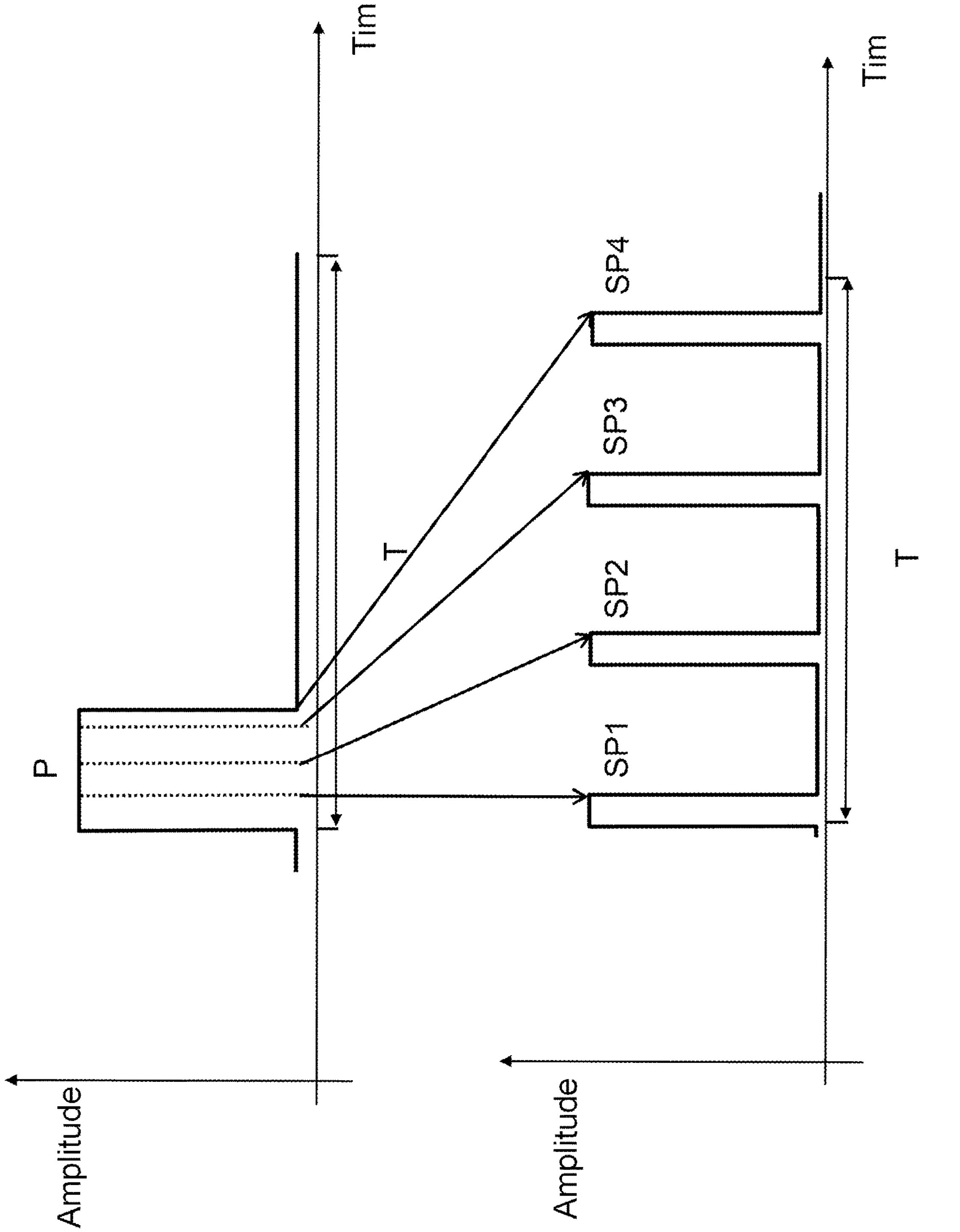
FIG. 5 shows how one period T can be divided into 4 sub-pulses SP1, SP2, SP3 and SP4 that have been distributed across one period. Depending on the application, it may be desirable to divide one period in more than 4 intervals.

In some cases, the shape of the pulse P is modified as illustrated on FIG. 5. If the period T is "long" or of the same order of magnitude as the time constant of a physical process of importance, it may be advantageous to "split" the pulse into several sub-pulses (SP) that are distributed throughout one period of the wave. In FIG. 5, one period T has been divided into 4 sub-pulses SP1, SP2, SP3 and SP4 that have been distributed across one period. Depending on the application, it may be desirable to divide one period in more than 4 intervals.

In digital systems, the duration of a pulse is a multiple of a clock period $T_{el}$. The minimum duty cycle that is possible to achieve with a given T and $T_{el}$ is thus $T_{el}$/T. As will be described further, the PWM period can be divided in so called bitblocks, each bitblock having the same duration $T_0$ which may be equal or larger than a reference clock period $T_d$.

Figure 6:
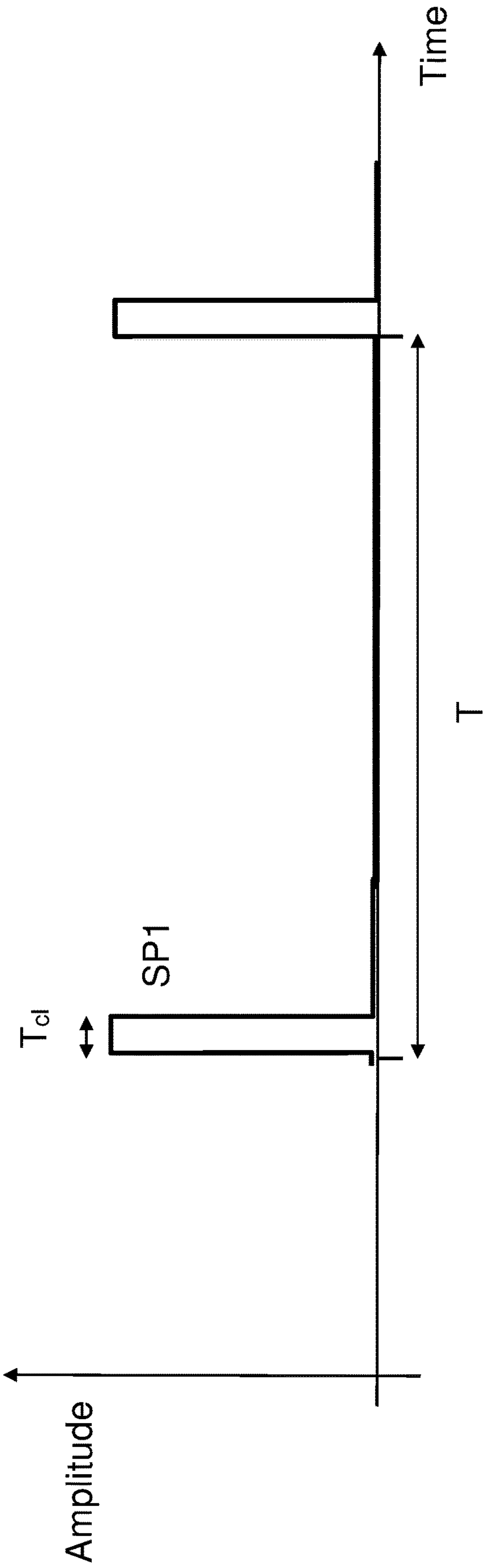
FIG. 6 shows the pulse width modulated signal when the duty cycle is set at its minimum value $T_{el}/T$.
Figure 7:
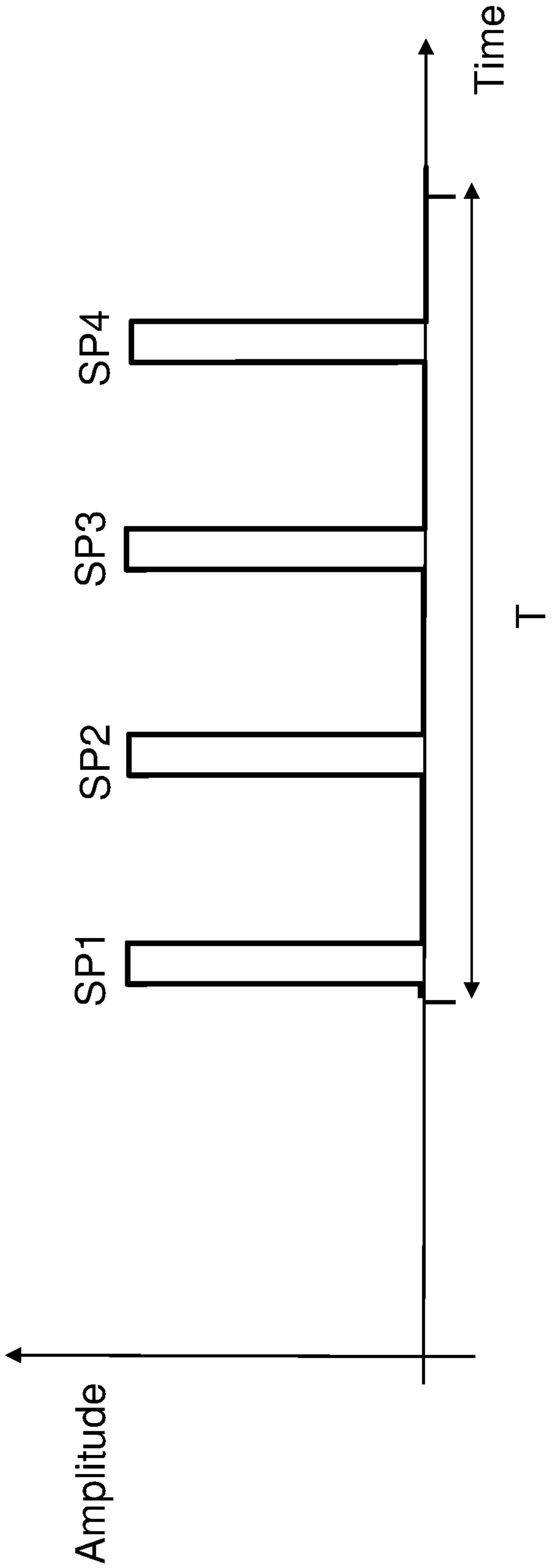
FIG. 7 shows how, if the duty cycle is further increased compared to FIG. 6 e.g. by 3 $T_{el}/T$, the pulse P can be split in two or more sub-pulses, each sub-pulses taking place in one of the intervals (or bitblocks) in which the period T has been divided.

If the duty cycle is set at its minimum value $T_{el}$/T, the pulse width modulated signal will be as seen on FIG. 6. If the duty cycle is further increased by e.g. 3 $T_{el}$/T, the pulse P can be split in two or more sub-pulses, each sub-pulses taking place in one of the intervals (or bitblocks) in which the period T has been divided as illustrated on FIG. 7.

As the duty cycle further increases, each of the intervals is filled-up so that the sum of the duration of the sub-pulses equals D*T.

With $I_0=0$, the average current <I> circulating in a light emitting element such as a light emitting diode driven by the PWM signal is:

$<I>=I_1*D/100$ (with D expressed in %) or $<I>=I_1*D$ (with D expressed as a fraction of T, as a real number in the interval [0,1])

In a LED and other types of fixed format displays, frames are displayed at a frequency of e.g. 60 Hz which corresponds to T=1/60 s. When LEDs are driven with a PWM signal, splitting a pulse into sub-pulses may reduce visible flickering (It is considered that anything below a critical flicker frequency or CFF can be seen. Splitting a pulse into several sub-pulses can be seen as increasing the frequency by as much as N, with N being the number of intervals into which a period is divided).

Even though in those cases, the waveform of the current may not be strictly that of a PWM signal as is usually known (e.g. as on FIG. 4), nevertheless reference will be made to PWM when discussing the LED current driving scheme.

Figure 8:
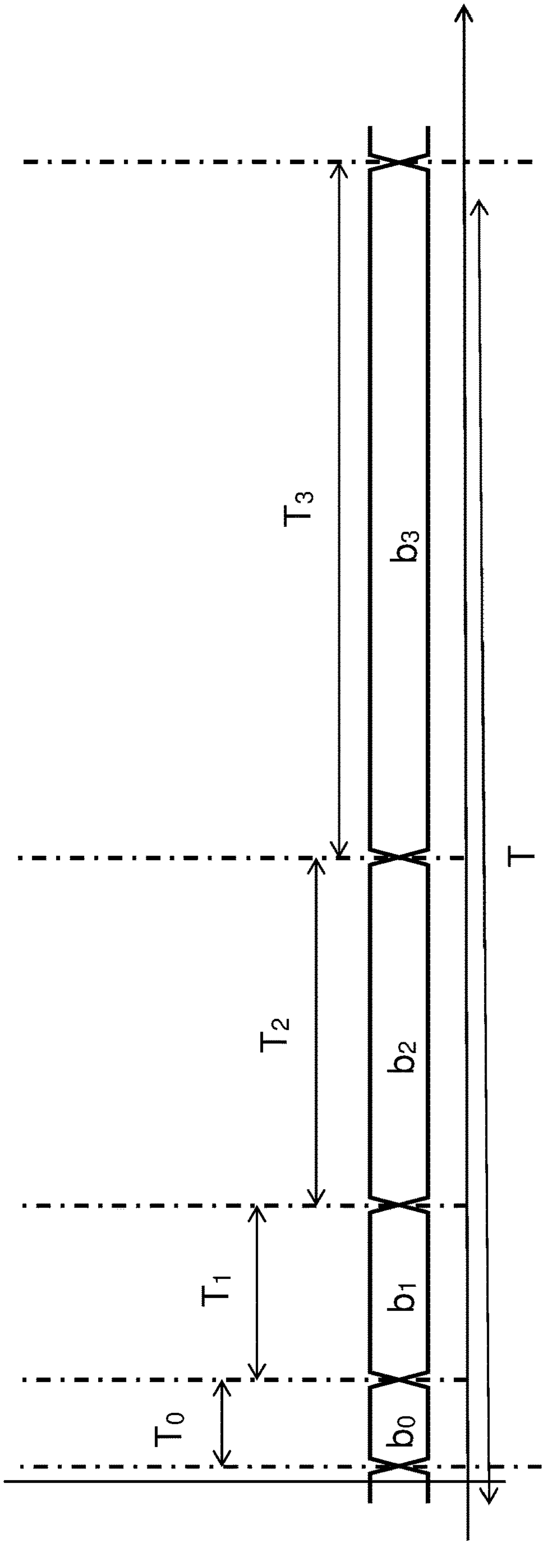
FIG. 8 shows an example of PWM sub-periods for a PWM duty cycle encoded with 4 bits b0, b1, b2 and b3 (with b0 the LSB and b3 the MSB). In this example, the period T of the PWM signal has been divided in four sub-periods or four PWM time intervals $T_0$, $T_1$, $T_2$, $T_3$ such that $T=T_0+T_1+T_2+T_3$.

Alternatively, instead of dividing a period T in bitblocks of equal duration, each period T of a PWM signal can be divided into multiple different PWM sub-periods that are sequentially provided at different times. Each PWM sub-period has a different temporal length corresponding to a different bit of the multi-bit digital pixel value (providing a weighted PWM signal). FIG. 8 shows an example of PWM sub-periods for a PWM duty cycle encoded with 4 bits b0, b1, b2 and b3 (with b0 the LSB and b3 the MSB). In this example, the period T of the PWM signal has been divided in four sub-periods or four PWM time intervals $T_0$, $T_1$, $T_2$, $T_3$ such that $T=T_0+T_1+T_2+T_3$.

A light emitting element such as a light emitting diode can be controlled to be on (i.e. with a current of amplitude $I_{Max}$ flowing through it) for a given PWM time period when the corresponding bit of the multi-bit digital pixel value is logically ON and the LED is controlled to be off for a given PWM time period when the corresponding bit of the multi-bit digital pixel value is logically OFF, so that the amount output is specified by the ratio D of the sum of the temporal durations of the ON PWM time periods to the temporal duration of the entire PWM timing signal.

The duty cycle D is, for a bit depth of 4 bits:

$$D=(b_0T_0+b_1T_1+b_2T_2+b_3T_3)/T$$

In particular, the PWM weighted intervals can be such that $T_i=T_0\ 2^i$ and D is then given by:

$$D=(b_0T_0+b_1T_0*2+b_2T_0*4+b_3T_0*8)/T$$

For example, if $b_0=0$, $b_1=0$, $b_2=0$ and $b_3=1$; then $D=(0*T_0+0*T_0*2+0*T_0*2^2+1*T_0*2^3)=8\ T_0/T=8\ T_0/(15\ T_0)=8/15$.

The entire PWM timing signal is preferably able to switch at a sufficient rate and have a temporal duration small enough to avoid perceptible flicker. In some cases, the PWM period T and the Frame period (duration of a frame) can be equal. In other cases, the duration of a frame can be longer than the PWM period T and in particular, the duration of a frame can be a multiple of the PWM period T. In the example of embodiments developed further, the PWM period and the frame period can be taken equal for the sake of clarity of the figures.

PWM time periods can be split instead of being uninterrupted.

The successive intervals of duration $T_0$ that divide an entire PWM period T can be called bit blocks. Depending on the context, "bitblock" will refer to one such interval of time or to the logical value (1 or 0, high or low, H or L) of a bit during that time interval.

DETAILED DESCRIPTION OF EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Pulse Width Modulation

Embodiments of the present invention use a control scheme such as a Pulse width modulation (PWM) scheme for driving pixels or sub-pixels. Pulse width modulation (PWM) controls luminance by varying the time during which a constant current is supplied to a light emitting element such as a light emitting diode of which an OLED and a LED are two examples. Pulse-width modulation uses a rectangular pulse wave whose pulse width is modulated resulting in the variation of the average value of the waveform. FIG. 4 shows an example of such a rectangular pulse wave.

The square wave has a period T, a lower limit $I_0$ (typically. $I_0=0$), a higher limit $I_1$ and a duty cycle D. The duration of a pulse P (i.e. the time during which the signal is at its higher limit $I_1$) is D/100*T (if D is expressed in %). For instance, if D=50%, the duration of the pulse is ½ T.

In some cases, the shape of the pulse P is modified as illustrated on FIG. 5. If the period T is "long" or of the same order of magnitude as the time constant of a physical process of importance, it may be advantageous to "split" the pulse into several sub-pulses (SP) that are distributed throughout one period of the wave. In FIG. 5, one period T has been divided into 4 sub-pulses SP1, SP2, SP3 and SP4 that have been distributed across one period. Depending on the application, it may be desirable to divide one period in more than or less than 4 intervals.

In digital systems, the duration of a pulse is a multiple of a clock period $T_{el}$. The minimum duty cycle that is possible to achieve with a given T and $T_{el}$ is thus $T_{el}/T$. As will be described further, the PWM period can be divided in so-called bitblocks, each bitblock having the same duration $T_0$ which may be equal or larger than a reference clock period $T_{el}$.

If the duty cycle is set at its minimum value $T_{el}/T$, the pulse width modulated signal will be as seen on FIG. 6. If the duty cycle is further increased by e.g. 3 $T_{el}/T$, the pulse P can be split in two or more sub-pulses, each sub-pulse taking place in one of the intervals (or bitblocks) in which the period T has been divided as illustrated on FIG. 7.

As the duty cycle further increases, each of the intervals is filled-up so that the sum of the duration of the sub-pulses equals D*T.

With $I_0=0$, the average current <I> circulating in a light emitting element such as a light emitting diode driven by the PWM signal is:

$<I>=I_1*D/100$ (with D expressed in %) or $<I>=I_1*D$ (with D expressed as a fraction of T, as a real number in the interval [0,1])

In a solid-state display such as a LED or OLED display, e.g. of the type that can be used with embodiments of the present invention, frames are displayed at a frequency of e.g. 60 Hz which corresponds to T=1/60 s. When solid state light sources such as OLEDs or LEDs are driven with a PWM signal, splitting a pulse into sub-pulses may reduce visible flickering. For example, it is considered that anything below a critical flicker frequency or CFF can be seen. Splitting a pulse into several sub-pulses can be seen as increasing the frequency by as much as N, with N being the number of intervals into which a period is divided).

Even though in those cases, the waveform of the current may not be strictly that of a PWM signal as is usually known (e.g. as on FIG. 4), in this application nevertheless reference will be made to PWM when discussing any of the solid state light sources such as LED or OLED current driving schemes according to embodiments of the present invention.

Alternatively, instead of dividing a period T in bitblocks of equal duration, each period T of a PWM signal can be divided into multiple different PWM sub-periods that are sequentially provided at different times. Each PWM sub-period has a different temporal length corresponding to a different bit of the multi-bit digital pixel value (providing a weighted PWM signal). FIG. 8 shows an example of PWM sub-periods for a PWM duty cycle encoded with 4 bits b0, b1, b2 and b3 (with b0 the LSB and b3 the MSB). In this example, the period T of the PWM signal has been divided in four sub-periods or four PWM time intervals $T_0$, $T_1$, $T_2$, $T_3$ such that $T=T_0+T_1+T_2+T_3$.

A light emitting element such as a light emitting diode is controlled to be on (i.e. with a current of amplitude $I_{max}$ flowing through it) for a given PWM time period when the corresponding bit of the multi-bit digital pixel value is logically ON and the LED is controlled to be off for a given PWM time period when the corresponding bit of the multi-bit digital pixel value is logically OFF, so that the amount output is specified by the ratio D of the sum of the temporal durations of the ON PWM time periods to the temporal duration of the entire PWM timing signal.

The duty cycle D is, for a bit depth of 4 bits:

$$D=(b_0T_0+b_1T_1+b_2T_2+b_3T_3)/T$$

In particular, the PWM weighted intervals can be such that $T_1=T_0\ 2^i$ and D is then given by:

$$D=(b_0T_0+b_1T_0*2+b_2T_0*4+b_3T_0*8)/T$$

Figure 9:
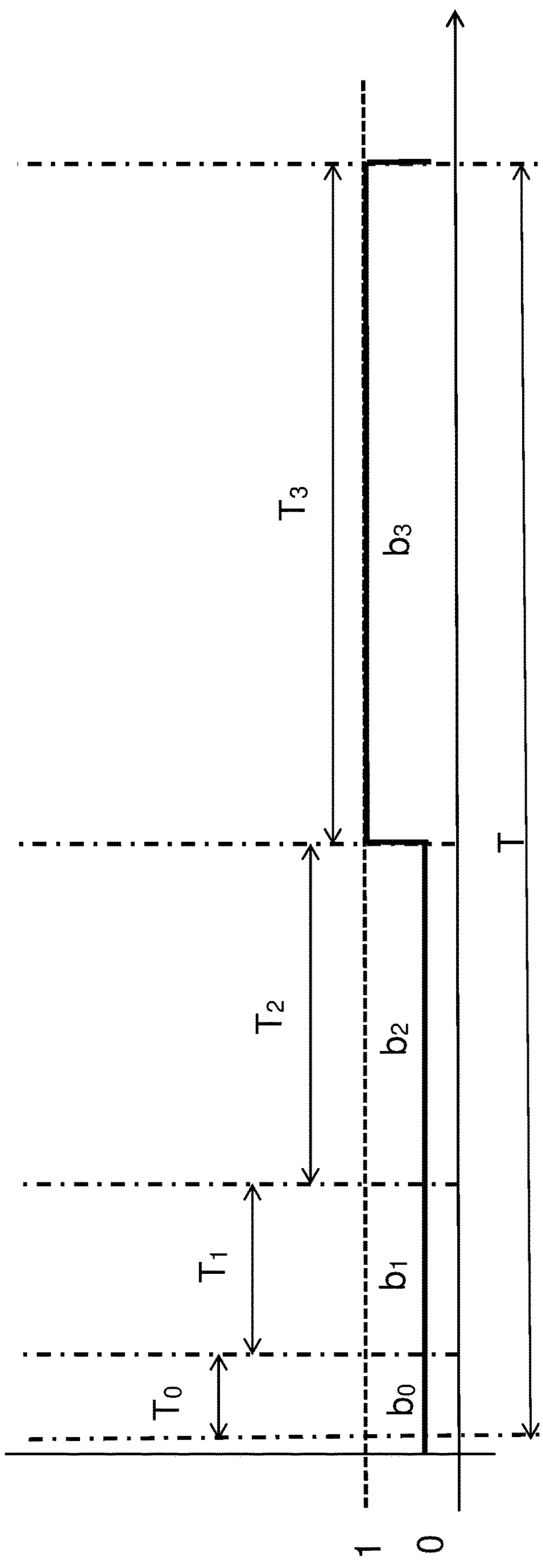
FIGS. 9 and 10 show how the PWM time periods can be split instead of being uninterrupted.

In the example of FIG. 9, with $b_0=0$, $b_1=0$, $b_2=0$ and $b_3=1$; then $D=(0*T_0+0*T_0*2+0*T_0*2^2+1*T_0*2^3)=8T_0/T=8T_0/(15\ T_0)=8/15$.

The entire PWM timing signal is preferably able to switch at a sufficient rate and have a temporal duration small enough to avoid perceptible flicker. In some cases, the PWM period T and the Frame period (duration of a frame) can be equal. In other cases, the duration of a frame can be longer than the PWM period T and in particular, the duration of a frame can be a multiple of the PWM period T. In the example of embodiments developed further, the PWM period and the frame period can be taken equal for the sake of clarity of the figures.

As mentioned earlier, the PWM time periods can be split instead of being uninterrupted. This is illustrated in FIGS. 9 and 10.

FIG. 9 shows an example of PWM signal encoded on 4 bits with $b_0=0$, $b_1=0$, $b_2=0$ and $b_3=1$ and for which the time period for $b_3$ is uninterrupted. The time period for $b_3$ is 8 times as long as the time period $T_0$ for bit $b_0$.

Figure 10:
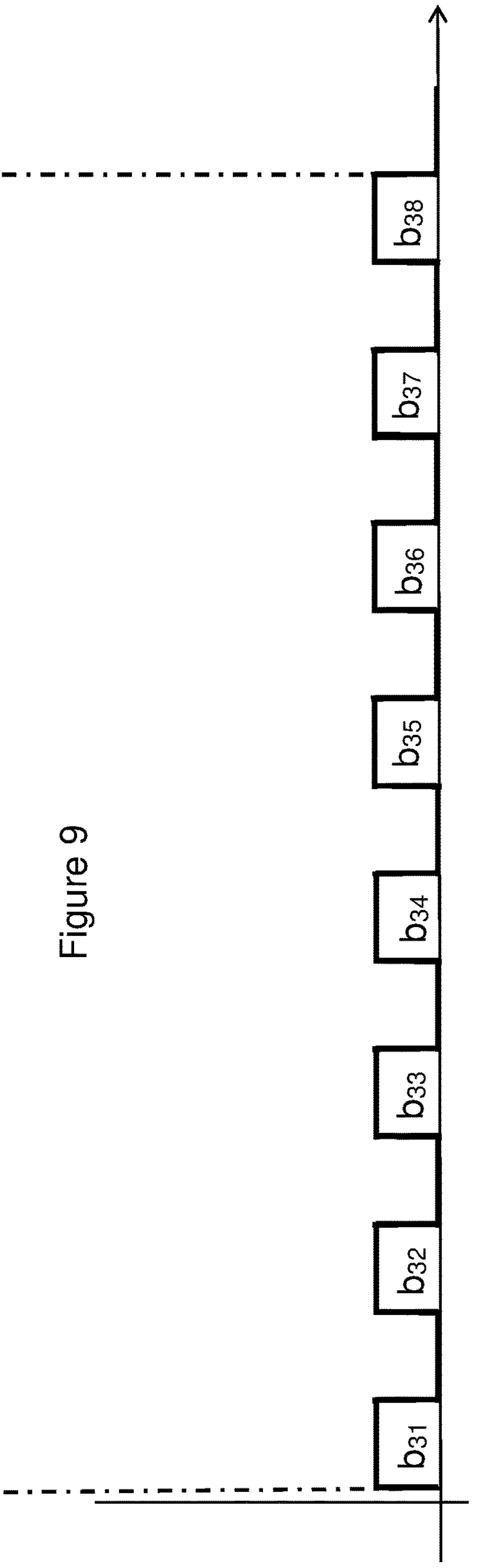

FIG. 10 shows an example of PWM signal encoded on 4 bits with $b_0=0$, $b_1=0$, $b_2=0$ and $b_3=1$ and for which the time period for $b_3$ is split as evenly as possible across the PWM period T. The pulse $b_3$ has been split into 8 sub-pulses $b_{31}$, $b_{32}$, $b_{33}$, $b_{34}$, $b_{35}$, $b_{36}$, $b_{37}$ and $b_{38}$. Each of the sub-pulses has a duration $T_0$ equal to the duration of the bit $b_0$ and the sum of the duration of the sub-pulses is equal to the duration $T_3=T_0*2^3$.

FIG. 11 shows an example of PWM signal encoded on 4 bits with $b_0=1$, $b_1=0$, $b_2=0$ and $b_3=1$ and for which the time period for $b_0$ and $b_3$ are split and distributed as evenly as possible across the PWM period T.

FIG. 12 shows the PWM signal encoded on 4 bits with $b_0=1$, $b_1=0$, $b_2=0$ and $b_3=1$ with a different distribution of the sub-pulses $b_{31}$, $b_{32}$, $b_{33}$, $b_{34}$, $b_{35}$, $b_{36}$, $b_{37}$ and $b_{38}$ and $b_0$.

The duty cycle D is the same for FIGS. 11 and 12.

The successive intervals of duration $T_0$ that divide an entire PWM period T can be called bit blocks. Depending on the context, "bitblock" will refer to one such interval of time or to the logical value (1 or 0, high or low, H or L) of a bit during that time interval.

According to embodiments of the present invention, the PWM signal can be used bit after bit (as e.g. in the example of FIG. 9) or bit blocks by bit blocks (as e.g. in the example of FIGS. 10, 11 and 12) to drive a solid state light source such as a LED or OLED. In order to keep the size of an active pixel small enough to be realized with thin film transistors and not to reduce resolution significantly, the memory associated with each pixel or subpixel stores less bits than the bit depth of the encoded PWM signal. For instance, if the bit depth is 12, the memory associated with each pixel or subpixel can store e.g. 2 bits or a single bit at a time. Contrary to what is disclosed in the prior art, it is preferred to store in the memory the value of the bit that must be applied during the next bitblock $b_{i,j+1}$ while the bit block $b_{i,j}$ is already used to drive a pixel or sub-pixel and the memory is updated at regular intervals $T_0$ (with $T_0$ being the duration of a bitblock). Alternatively, the memory stores the value of the bit $b_i$ that must be applied during the next PWM sub-period and the memory is updated at different time intervals, the duration of each time interval being function of the weight of the bit bi (as in the example of FIG. 8).

This is illustrated in Table 1 here below and in FIG. 13.

Table 1 shows the signals Di driving a LED during a given time interval or bitblock and the signals Pi+1 that are stored in a memory element and that will drive the LED during the next time interval or bitblock.

TABLE 1

| | | Display | | | | | | | | | | | |
|---|---|---|---|---|---|---|---|---|---|---|---|---|---|
| | | D0 | D1 | D2 | D3 | D4 | D5 | . . . | D59 | D60 | D61 | D62 | D63 |
| Program | P0 | P1 | P2 | P3 | P4 | P5 | P6 | . . . | P60 | P61 | P62 | P63 | |

FIG. 13 shows the enabled signal ES (Di in Table 1) that drives a Led at a given moment in time and the stored signal SS (Pi in Table 1) that is stored at a given moment in time and that will drive the LED during the next bitblock.

Further Embodiments

In the following description of embodiments of the present invention, wherever a B is used as in QB this means an inverting output.

A driver circuit or current control circuit 153 according to embodiments of the present invention can comprise:

- a control element with a first control electrode, to control the flow of current through a light emitting element;
- a first storage element to store a first value of a control signal, said control signal being applied to the first control electrode of the control element;
- a second storage element to store a second value of a control signal;
- a transfer element with a second control electrode to load the first storage element with the second value of the control signal.

For definitions of the components see the definition section above.

The control element, the first storage element, the second storage element and the transfer element are advantageously realized with the same thin film transistor technology.

With a circuit according to embodiments of the present invention, it is possible to load a second control signal (e.g. voltage) on the second storage element while the first control signal (voltage) is applied to the control electrode of the control element by the first storage element to control the current in the light emitting element. There is thus no "dead time" during which the light emitting element remains idle because no data is available to control it.

In the description of the circuit illustrated on FIG. 14A:

- A control element can be a transistor 143 and a first control electrode can be the gate 1433 of transistor 143. The transistor can be a pMOS transistor, e.g. a thin film transistor. The control element is connected to a LED or OLED diode light emitting element 146 for providing control thereof. The transistor can be operatively connected with a light source such as a LED or OLED and operatively connected with a current source 145.
- The first storage element can be a capacitor or a capacitive circuit such as a sample and hold device e.g. comprising a sample and hold capacitor 144 or other storage elements that present their value immediately such as an unclocked flip-flop. The first storage element such as a capacitor e.g. of a sample and hold capacitor 144 is connected between the gate 1433 and a supply voltage VDD. It could also be connected between the gate 1433 and the output of the current source 145.
- The second storage element can be a programmable memory such as a one-bit, two-bit or multibit memory such as can be provided by flip-flop 141. The second storage element can be clocked. The number of bits that can be stored on the second storage element should be less than the bit depth of the control signal such as a PWM signal; and
- The transfer element can be a transistor 142. The transistor 142 is connected on one side to the second storage element 141 and on the other to the gate 1433. The gate of the transfer element 142 is connected to receive an ENB signal. Transfer element 142 transfers the value (or voltage) from the second storage to the first storage element.
- The Data signal in FIG. 14A (control signal) is daisy chained. So every clock cycle on the control signal there is a bit going to the next one-bit memory such as a Flip_Flop. The first and second storage only captures one bit of the control signal towards the light emitting element 146.

FIG. 14A shows an example of a control circuit or a driver circuit 152 to drive a pixel or a sub-pixel of a solid-state light source 146 according to an embodiment of the present invention.

The PWM bits can be stored one bit at a time in the second storage element such as in a one-bit memory cell like e.g. a D-flip-flop 141 or a programmable device having a two-bit memory or a multibit memory as can be provided by several flip-flops provided the number of bits of the memory is less than the bit depth of the control signal such as a PWM signal. The second storage element can be clocked. The second storage element such as the flip-flop 141 has an input (D) and an output. The second storage elements such as flip flops 141 being a one-bit memory or a two-bit memory or a multibit memory provided the number of bits of the memory is less than the bit depth of the control signal such as a PWM signal, of adjacent pixels in the same column C or the same row R of an array of pixels can be daisy chained (as illustrated in e.g. FIG. 15). This daisy chain configuration limits the number of separate tracks that would otherwise be required to control each pixel or sub-pixel of an array.

A value can be captured into the one-bit memory e.g. a Flip-Flop 141 (which is the second storage element in this embodiment) while the light emitting device 146 is enabled with the previous stored value (from the first storage element). A value can be stored without interfering with the value being displayed. Therefore, in FIG. 14A the output of a one-bit memory such as a Flip_Flop 141 can be updated without interrupting the display of an image.

The output Q of the second storage element such as the flip-flop 141 or a two-bit memory or a multibit memory provided the number of bits of the memory is less than the bit depth of the control signal such as a PWM signal, is updated by a clock signal (Clk). The transistor 142 which is a transfer element is used as a switch that, when closed, connects the output of second storage element such as the flip-flop 141 being a one-bit memory or a two-bit memory or a multibit memory provided the number of bits of the memory is less than the bit depth of the control signal such as a PWM signal, to the gate 1433 of control element such as the transistor 143 and an electrode of a first storage element such as a capacitor $C_{SH}$ 144 or a capacitive circuit such as a sample and hold circuit with a capacitor $C_{SH}$ 144 or an unclocked flip-flop. The transistor 142 and the transistor 143 can be thin film transistors such as pMOS transistors.

The transfer elements such as transistors 142 are controlled by an enable signal (EN or ENB). In the example of FIG. 14A, the transfer elements such as the transistor 142 is a pMOS transistor that connects the output QB (that can also be noted as $\underline{Q}$ or $\overline{Q}$ as in FIG. 14A) of the programmable memory element such as flip-flop 141 or a two-bit memory or a multibit memory provided the number of bits of the memory is less than the bit depth of the control signal such as a PWM signal, to the gate 1433 of control element such as the transistor 143 when the enable signal is low (e.g. GND). At the same time, the first storage element such as capacitor ($C_{SH}$) 144 or a capacitive circuit or an unclocked flip-flop with a first electrode connected to the gate 1433 of transistor 143 and with a second electrode connected to e.g. a supply voltage (VDD) samples the voltage $V_{Out}$ at the output of the programmable memory element such as the flip-flop 141 or a two-bit memory or a multibit memory provided the number of bits of the memory is less than the bit depth of the control signal such as a PWM signal, and will hold the gate 1433 of the control element such as transistor 143 at the same voltage even when the transfer element such as the switch or transistor switch 142 is opened.

The control element such as the transistor 143 can be used as a switch. When closed, the transistor used as a switch 143 connects a current source 145 with a light emitting element such as a light emitting diode e.g. a LED or OLED 146, which can emit light. When the switch 143 is open, no current flows through the light emitting element such as the LED or OLED 146 and it emits no light.

If, as in the example of FIG. 14A, the control element such as the transistor 143 is a pMOS transistor, it can be connected to the inverting output QB instead of to the output Q of the flip-flop 141 or of a two-bit memory or a multibit memory provided the number of bits of the memory is less than the bit depth of the control signal such as a PWM signal. Indeed, if a pMOS transistor is used for switch 143, a "low" signal (e.g. GND voltage) will close that switch and allow the current of current source 145 to flow through the light emitting diode 146 such as an OLED or LED. This means that when a bit bi,j is 'high' i.e. when the bit bi,j is equal to '1', the light emitting element 146 such as the LED or OLED emits light when the switch, such as a transistor 142 is closed and that when bit bi,j is 'low' i.e. when the bit bi,j is equal to '0' (and $\underline{\text{bi,j}}$ at the output QB is high), the light emitting element 146 such as the LED or OLED 146 does not emit light when the transfer element such as the switch 142 is closed and the value of $\underline{\text{bi,j}}$ is held by the first storage element e.g. is sampled and held by the sample and hold device such as the capacitor 144.

Once the output of the second storage element comprising the programmable memory element, such as flip-flop 141, has been applied to the first storage element, e.g. has been sampled and stored on the sample and hold device such as capacitor 144, the transfer element such as the switch 142 can be opened and the next bit can be stored in the second storage element e.g. memory element such as a flip-flop 141 or a two-bit memory or a multibit memory provided the number of bits of the memory is less than the bit depth of the control signal such as a PWM signal.

An advantage of that aspect of the invention is that bits stored in the second memory element such as the flip-flop 141 or a two-bit memory or a multibit memory provided the number of bits of the memory is less than the bit depth of the control signal such as a PWM signal, can be updated without interrupting the display of an image.

FIG. 14B shows the sequence of signals at various nodes of the circuit shown on FIG. 14A. The high state (H) corresponds to be binary value 1. The low state (L) corresponds to be binary value 0. The "don't care" state means that the binary value can be either 1 or 0.

At time $t_0$, a data signal e.g. bit $b_0$ is presented at the input of the flip-flop 141 (or a two-bit memory or a multibit memory provided the number of bits of the memory is less than the bit depth of the control signal such as a PWM signal). In the example of FIG. 14B, b0=1. At the rising edge of a clocking signal CLK, the output Q of the flip-flop 141 (or a two-bit memory or a multibit memory provided the number of bits of the memory is less than the bit depth of the control signal such as a PWM signal), is updated such that $Q=b_0$ while the output QB of the flip-flop 141 (or a two-bit memory or a multibit memory provided the number of bits of the memory is less than the bit depth of the control signal such as a PWM signal), is updated such that $QB=\underline{b_0}$ (the logical inverse of $b_0$).

At time t1>t0, the output of the flip-flop 141 (or a two-bit memory or a multibit memory provided the number of bits of the memory is less than the bit depth of the control signal such as a PWM signal), is connected to a first storage element such as a capacitor or a capacitive circuit such as a sample and hold device with a sample and hold capacitor 144 or an unclocked flip-flop are examples. This is done by closing a switch such as the switch transistor 142 that conditionally connects the output QB of the flip-flop 141 (or a two-bit memory or a multibit memory provided the number of bits of the memory is less than the bit depth of the control signal such as a PWM signal) and the first storage element such as the capacitor or a capacitive circuit such as the sample and hold device with the sample and hold capacitor 144 ($C_{SH}$) or an unclocked flip-flop are examples. If the switch such as the switch transistor 142 is a pMOS transistor, it is closed by forcing enable signal ENB to a low state (e.g. ground), as shown in FIG. 14B. The enable signal ENB is kept low until a time $t_3>t_2$, with $\Delta t=t_3-t_2$ being long enough to guarantee a correct charging or loading of the first storage element 144.

Whatever voltage was stored across the first storage element such as the capacitor or a sample and hold device with a sample and hold capacitor 144 or an unclocked flip-flop are examples, is "erased" and updated in function of the signal (in this case a voltage at the output QB) stored on the second storage element such as the one-bit memory flip-flop 141 (or a two-bit memory or a multibit memory provided the number of bits of the memory is less than the bit depth of the control signal such as a PWM signal). In the example of FIG. 14B, with $b_0=1$, QB=0 and VG=0 (with VG the voltage applied to the control electrode 1433, e.g. gate, of the control element 143, e.g. a transistor). With VG=0 (e.g. GND), the control element 143, e.g. a transistor connects the current source 145 with the light emitting diode such as an LED or OLED 146 and the current circulating in the LED or OLED 146 is $I_{Max}$.

The updated signal is applied to the control electrode 1433 of the control element 143 such as a transistor for a time $T_{Hold}$. $T_{Hold}$ can be the duration of a bit block. $T_{Hold}$ can also be the duration of a PWM sub-period ($T_0$, $T_1$, $T_2$, $T_3$ . . . as exemplified on e.g. FIG. 9.

Before the end of $T_{Hold}$; e.g. at time $t_4>t_3$; a new data signal (e.g. $b_1$) can be presented at the input of the flip flop 141 (or a two-bit memory or a multibit memory provided the number of bits of the memory is less than the bit depth of the control signal such as a PWM signal) and the output QB of the one-bit memory flip-flop 141 (or the two-bit memory or a multibit memory provided the number of bits of the memory is less than the bit depth of the control signal such as a PWM signal), is updated upon the rising edge of a clock signal CLK. In the example of FIG. 14B, $b_1$=1 with $b_1$ following $b_0$.

As was the case for $b_0$, the bit stored on the second storage element 141 such as on a flip-flop or a two-bit memory or a multibit memory provided the number of bits of the memory is less than the bit depth of the control signal such as a PWM signal, can overwrite the data stored on the first storage element 144 such as a capacitor or a capacitive circuit such as a sample and hold device, e.g. with a sample and hold capacitor or an unclocked flip-flop, by closing the transfer element 142 such as a transistor. On FIG. 14B, this happens at time $t_5$>$t_4$ with the ENB signal set to low which results in the signal VG being set to high. The control element 143 such as a transistor is opened, disconnecting the current source 145 from the light emitting diode such as the LED or OLED 146. The current ILED is set to $I_{Min}$.

$T_{Hold}$ can have the same duration for each data signal (i.e. if bit blocks are used). Alternatively, the duration of $T_{Hold}$ can vary in function of the data signal, in particular in function of the weight of the bit stored on the first storage element 144 such as a capacitor or a capacitive circuit such as a sample and hold device or a sample and hold capacitor or an unclocked flip-flop.

FIG. 14C shows an alternative implementation for a pixel according to the invention.

For the circuit illustrated on FIG. 14C:

- the control element is, for example, a transistor 143 and the first control electrode 1433 is, for example a gate of the transistor 143; the transistor can be a pMOS transistor, e.g. a thin film transistor. The control element is connected to a light emitting diode such as an OLED or LED 146, The transistor can be operatively connected with a light source such as a LED or OLED and operatively connected with a current source 145;
- the first storage element can be a capacitor or a capacitive circuit such as a sample and hold device having a sample and hold capacitor 144 or an unclocked flip-flop; the first storage element such as the capacitor or the sample and hold capacitor 144 or an unclocked flip-flop s connected between the gate 1433 and a supply voltage VDD;
- The second storage element 147 is, for example, a capacitor $C_2$ or a capacitive circuit such as a sample and hold device or an unclocked flip-flop; the second storage element is connected between the voltage supply VDD and an electrode of a transfer element 142;
- The transfer element is, for example, a transistor 142;
- a loader which can be a transistor 148; the loader 148 being connected to a data line
- reset switch such as a reset transistor 149; the reset switch 149 is connected between the voltage supply VDD and the gate electrode 1433;
- a light emitting element such as an OLED or LED pixel or sub-pixel 146; the light emitting element being connected between the control element such as the transistor 143 and a voltage supply; and
- a current source 145; the current source 145 being connected between the voltage source VDD and the control element such as the transistor 143.

Instead of storing the bits encoding the PWM signal with a flip-flop 141 (or a two-bit memory or a multibit memory provided the number of bits of the memory is less than the bit depth of the control signal such as a PWM signal), a second capacitor $C_2$ is used as the second storage element (element 147 on FIG. 14C) instead of element 141. The second storage element 147 such as capacitor $C_2$ can be loaded by means of a loading element such as the loading transistor 148 controlled by a "Scan Line #X" signal. The second storage element 147 in combination with the transistor 148 carries out the function of a one-bit memory. If, as shown in FIG. 14C, the loading element such as the loading transistor 148 is a pMOS transistor, "Scan Line #X" low will bring the "Data" line in contact with an electrode of the second storage element 147 such as the capacitor $C_2$ and load it with the voltage present on the Data line.

The transfer element such as transistor 142 is closed or opened by the signal ENB and the signal loaded on the second storage element 147 such as capacitor $C_2$ is transferred to the first storage element such as a capacitor or a capacitive circuit such as a sample and hold device. e.g. capacitor $C_{SH}$ (numbered 144 on FIG. 14C) or an unclocked flip-flop that controls the control electrode 1433 of the control element such as a transistor switch 143.

A reset element such as a reset transistor 149 is controlled by signal RSTB and can discharge the first storage element such as the capacitor or the capacitive circuit such as a sample and hold device. e.g. having capacitor $C_{SH}$ or an unclocked flip-flop, and turn off the first control element such as transistor switch 143.

When activated, the reset element such as the reset transistor 149 will discharge the capacitor or a capacitive circuit e.g. the sample and hold device such as capacitor 144 or an unclocked flip-flop and no current will circulate in the light source 146 such as a LED or OLED. The role and usefulness of the reset element such as the reset transistor 149 will be discussed below in more detail.

FIG. 15 shows adjacent pixels or sub-pixels 150A, 150B, 150C in the same column with their respective programmable memory elements such as flip flops 151A, 151B, 151C (or two-bit memories or a multibit memories provided the number of bits of the memory is less than the bit depth of the control signal such as a PWM signal), connected in a daisy chain (i.e. the output of the programmable memory element such as the flip flop of a sub-pixel (or pixel) is connected to the input of the programmable memory element such as the flip flop of the next sub-pixel (or pixel)(or the same for a two-bit memory or a multibit memory provided the number of bits of the memory is less than the bit depth of the control signal such as a PWM signal). For instance, the output QA of the programmable memory element such as flip flop 151A is connected to the input of the programmable memory element such as the flip flop 151B and the output QB of the programmable memory element such as the flip flop 151B is connected to the input of the programmable memory element such as the flip flop 151C. In that configuration, the programmable memory elements such as the flip flops of the sub-pixel or pixel in the same column form a shift register.

With this configuration, all the sub-pixels or pixels in the same column can be controlled according to the present invention with only three signals (EN, CLK and DATA). The electrically conducting track for the DATA signal is easy to route from one sub-pixel or pixel to an adjacent pixel or sub-pixel (i.e. track segments connecting the output of a programmable memory element such as a flip flop to the input of the next programmable memory element such as the flip flop).

Each pixel or subpixel in FIG. 15 is shown as including a current control or driving circuit of FIG. 14A. Herewith expressly disclosed is a substitution of any of the circuits of FIGS. 14C, 17, 22-27 to replace the circuit shown in this figure.

The programmable memory elements such as the flip flops 151A. 151B, 151C . . . (or two-bit memories or a multibit memories (provided the number of bits of the memory is less than the bit depth of the control signal such as a PWM signal) in the same column must have all been programmed with their corresponding PWM bit or bit block before that PWM bit or bit block is sampled and held by the sample and hold device 144 such as the sample and hold capacitor $C_{SH}$ of each active sub-pixel or pixel 150A, 150B, 150C . . . .

To illustrate this, let us take as an example the pixels of FIG. 15 that must display data according to a PWM signal having a bit depth of four.

For this example, in a given frame:

The PWM signal that will determine the grayscale of (sub)pixel 150 A is with $b_0=1$, $b_1=0$, $b_2=0$ and $b_3=0$ The PWM signal that will determine the grayscale of (sub)pixel 150 B is with $b_0=0$, $b_1=1$, $b_2=0$ and $b_3=0$ and The PWM signal that will determine the grayscale of (sub)pixel 150 C is with $b_0=1$.

$b_1=0$, $b_2=1$ and $b_3=0$

FIG. 16 illustrates how bits are sent and stored while the light emitting elements such as the LEDs or OLEDs 146 are emitting light according to information encoded by bits previously stored in the first storage element (e.g. memory element) of each pixel or sub-pixel. For the sake of simplicity and merely as an example, the discussion will be limited to three successive pixels or sub-pixels 150A, 150B and 150C. As seen on FIG. 15, the second storage elements are memory elements and are preferably programmable memory elements such as D flip-flops or two-bit memories or multibit memories provided the number of bits of the memory is less than the bit depth of the control signal such as a PWM signal, that are daisy chained to form a shift register. Data is fed into the shift register through the input D of the flip flop 151A (input Data_In on FIG. 15) (or through a two-bit memory or a multibit memory provided the number of bits of the memory is less than the bit depth of the control signal such as a PWM signal).

As an example, a description will be made of how a first bit (e.g. $b_0$) is stored in the first storage element, e.g. a programmable memory element such as the flip-flop ($b_{0A}$ in 151A, $b_{0B}$ in 151B, $b_{0C}$ in 151C) of each sub-pixel or pixel (150A, 150B, 150C), respectively and how a second bit (e.g. $b_1$) is eventually stored in the same second storage element, e.g. the programmable memory element such as a flip-flop ($b_{1A}$ in 151A, $b_{1B}$ in 151B, $b_{1C}$ in 151C) while the light emitting elements such as LEDs or OLEDS keep emitting light according to the information encoded in the first bit in the first storage element. As was the case for FIG. 14A, the description is given for a circuit where the transfer element and the control element are pMOS transistors, 142, 143 respectively: each of these elements behaves like a switch that (a) is closed when a LOW signal is applied to their control electrode and (b) is open when a HIGH signal is applied to their control electrode.

By way of example, assuming that $b_{0A}=1$, $b_{0B}=0$, $b_{0C}=1$ and $b_{1A}=0$, $b_{1B}=1$, $b_{1C}=0$.

To shift the bits $b_{0A}$, $b_{0B}$ and $b_{0C}$ through the shift register, $b_{0C}$ is first presented at the input of a second storage element, e.g. a programmable memory element such as at the input Data_In before a clock signal (CLK) is applied. The operation is repeated for $b_{0B}$ and $b_{0A}$ as seen on FIG. 16. After three clock cycles, QA=1, QB=0 and QC=1. An enable signal (EN) is set to high at time $t_0$ (which means that ENB (which is the logical inverse of the EN signal) applied to the gate of the transfer element such as the pMOS transistor 142 of FIG. 14A is set to low and the transfer element such as the pMOS transistor 142 acts as a closed switch). With EN high, the output of the second storage element e.g. the programmable memory element such as the flip flop 141 (or a two-bit memory or a multibit memory provided the number of bits of the memory is less than the bit depth of the control signal such as a PWM signal), is copied onto the first storage element, e.g. the capacitor or capacitive circuit such as the sample and hold device 144 e.g. having the capacitor $C_{SH}$, or an unclocked flip-flop, of each pixel or sub-pixel thereby opening or closing the control element such as the transistor 143 connecting the light emitting element such as the LED or OLED 146 of each pixel or sub-pixel to the current source 145 according to the state of the bit $b_0$ that was stored as QA, QB or QC. In the embodiments of FIGS. 14A, 15 and 16, with QA=QC=1 and QB=0, current flows through the light emitting element such as the LED or OLED 146 of pixels or sub-pixels 150A and 150C while no current flows through the light emitting element such as LED or OLED 146 of pixel or sub-pixel 150B. The EN signal is then set back to low and the currents $I_A$, $I_B$ and $I_C$ flowing in light emitting elements such as the LEDs or OLEDs 146 of pixels or sub-pixels 150A, 150B and 150C respectively, will remain unchanged as long as the voltage across the first storage element such as the capacitor or capacitive circuit, e.g. sample and hold device 144 such as the sample and Hold capacitor $C_{SH}$, is not updated.

The light emitting elements such as LEDs or OLEDs 146A, 146B and 146C are now emitting light according to the bits $b_{0A}=1$, $b_{0B}=0$ and $b_{0C}=1$. This will remain unchanged for a time interval $T_0$ (which can be the duration of the PWM sub-period of the least significant bit if PWM sub-periods are used as well as the duration of a bit block if bit blocks are used). During that time interval $T_0$, the next bits $b_{1A}$, $b_{1B}$ and $b_{1C}$ can be shifted through the shift register exactly as was done for the bits $b_{0A}$, $b_{0B}$ and $b_{0C}$.

At the end of the time interval $T_0$, the EN signal is set high again. With EN high, the output of the second storage element, e.g. the programmable memory element such as the flip-flop (or a two-bit memory or a multibit memory provided the number of bits of the memory is less than the bit depth of the control signal such as a PWM signal), is copied onto the first storage element, e.g. the capacitor or a capacitive circuit sample and hold device 144 having the sample and hold capacitor $C_{SH}$ or an unclocked flip-flop, of each pixel or sub-pixel thereby opening or closing the control element such as transistor 143 connecting the light emitting element such as the LED or OLED of each pixel or sub-pixel 146 to the current source 145 according to the state of the bit $b_1$ that was stored as QA, QB or QC. In the examples of FIGS. 14A, 15 and 16, with $Q_A=Q_C=0$ and $Q_B=1$, current flows through the light emitting element such as the LED or OLED 146 of pixel or sub-pixel 150B while no current flows through the light emitting elements such as the LED or OLED 146 of pixels or sub-pixels 150A and 150C. The EN signal is then set back to low and the currents $I_A$, $I_B$ and $I_C$ in the light emitting elements such as the LEDs or OLEDS 146 of pixel or sub-pixel 150A, 150B and 150C respectively will remain unchanged as long as the voltage across the first storage element, e.g. the sample and hold device 144 having the Sample and Hold capacitor $C_{SH}$ or an unclocked flip-flop, is not updated.

The other bits encoding the PWM signal that control the light emitted by the light emitting element such as the LED or OLED 146 of the pixel or sub-pixel can be programmed in the same way for the next time interval (of duration $T_0$ when bit blocks are used and of duration $T_N=T_0*2^N$ for a bit of weight N if PWM sub-periods are used instead of bit blocks).

This can of course be generalized to more than 3 pixels in the same column (row) of an array.

Each of the bits meant for the second storage element of the current control circuits 153 in the same column (or line) in an array of current control circuits 153 are applied sequentially to the input Data_In of the second storage element; e.g. the programmable memory element such as the flip flop 141 (or a two-bit memory or a multibit memory provided the number of bits of the memory is less than the bit depth of the control signal such as a PWM signal), in the column (or line) of current control circuits 153 and shifted through the shift register formed by the second storage elements such as the programmable memory elements or flip-flops 141 (or two-bit memories or multibit memories provided the number of bits of the memory is less than the bit depth of the control signal such as a PWM signal), of adjacent current control circuits 153 in the same column (or line).

The bits are presented sequentially at the input of the column (or line) wide shift register and shifted through the shift register by clocking the shift register with a series of Nb first clock signals (where Nb is the length of the shift register). When the Nb bits have been shifted through the shift register, the content of the second storage element 141 such as the flip-flop or a two-bit memory or a multibit memory provided the number of bits of the memory is less than the bit depth of the control signal such as a PWM signal, is then transferred to the first storage element 144 such as a capacitor or a capacitive circuit such as the sample and hold device or the sample and hold capacitor or an unclocked flip-flop by applying an enabling signal to the control electrode 1433 of the transfer element 143 which can be a transistor of each current control circuit 153. In that case, T0 must be at least as long as the time required to load the shift register with the Nb bits.

It is an advantage of that aspect of the invention that the first storage elements 144 (such as capacitors or capacitive circuits such as sample and hold devices or sample and hold capacitors or unclocked flip-flops) of the current control circuits 153 in the same column (or line) are updated at the same time. Alternatively, the update can be done for the entire array at the same time.

In a further embodiment of the invention, the bit depth encoding the PWM signal is increased without having to change the duration of $T_0$.

As was described earlier, the minimum duration for $T_0$ is equal to the time required to shift the bits (like e.g $b_{0A}$, $b_{0B}$, $b_{0C}$ . . . ) through the shift register formed with the second storage elements, e.g. programmable memory elements (151 A, 151B. 151C) such as flip-flops or two-bit memories or multibit memories provided the number of bits of the memory is less than the bit depth of the control signal such as a PWM signal, of the pixels or sub-pixels 150.

The PWM period T cannot be increased beyond a maximum value determined by the required frame rate.

Increasing the bit depth is therefore not easy and, in some cases, it is even impossible with the solutions described in the prior art.

Let us take an example where e.g. the PWM signal will be encoded with 2 additional bits with lesser weight than the bit $b_0$. These bits will be referred to as $b_{-1}$ and $b_{-2}$.

In the previous example, the bit depth was e.g. 4 and the PWM signal was encoded with the bits $b_0$, $b_1$, $b_2$ and $b_3$. To illustrate how the bit depth can be increased, it is assumed that a PWM signal is encoded with 6 bits $b_{-2}$, $b_{-1}$, $b_0$, $b_1$, $b_2$ and $b_3$.

If PWM sub-periods are used, the duration of PWM sub-periods for each bit is given in table 2:

TABLE 2

| | Bit | | | | | |
|---|---|---|---|---|---|---|
| | $b_{-2}$ | $b_{-1}$ | $b_0$ | $b_1$ | $b_2$ | $b_3$ |
| Duration of PWM period | ¼ $T_0$ | ½ $T_0$ | $T_0$ | 2 $T_0$ | 4 $T_0$ | 8 $T_0$ |

As mentioned earlier, the minimum PWM sub-period cannot be decreased below $T_0$ otherwise, one cannot keep using the same shift register according to the same method. An alternative solution would for instance require an increase of the number of signal tracks to bring the data in parallel to each pixel or group of pixels (sub-pixels or group of sub-pixels).

To nevertheless keep using the same architecture for the array of pixels or sub-pixels and the associated driver circuit according to another aspect of the present invention, a reset signal RST is used. The reset signal RST actuates a reset element e.g. a switch 171 in the active pixels or sub-pixels. The circuit of FIG. 14A is modified as shown on FIG. 17. A reset element or switch 171 is connected between the gate 1433 of the control element such as transistor 143 and a reference voltage e.g. VDD, whereby the choice of VDD is particular to the case of a pMOS transistor 143. When closed, the reset element or switch 171 forces the voltage at the gate 1433 of the control element such as transistor 143 to VDD thereby opening it and no current can flow through the light emitting element such as the OLED or LED 146. When the reset element or switch 171 is open, the voltage at the gate 1433 of transistor 143 is determined by the voltage of the first electrode of the first storage element, an example being a capacitor or a capacitive circuit such as the sample and hold device 144 e.g. the sample and hold capacitor $C_{SH}$ or an unclocked flip-flop. In this example, when the reset signal RST is high, the reset element such as the switch 171 is closed and when the reset signal RST is low, the reset element or switch 171 is open. With RST high and the control element such as the transistor 143 "open", the light emitting element or LED or OLED 146 is turned off. In FIG. 17, element 171 can overwrite the value stored in the first storage element.

FIG. 18 illustrates how the RST signal can be used to enable a higher bit depth. A circuit similar to that of FIG. 15 is still used and the description is limited to the three first pixels in a row or column of the pixel array for clarity reasons. This time, each current driver circuit 153 is equipped with a reset element such as the reset switch 171 as on the circuit of FIG. 17. As was the case for FIG. 16, a second storage element. e.g. a programmable memory element such as a D flip-flop or a two-bit memory or a multibit memory, provided the number of bits of the memory is less than the bit depth of the control signal such as a PWM signal, is provided that is triggered on the rising edge of the clock signal.

As was described earlier, the minimum PWM sub-period or the duration of a bit block is $T_0$. $T_0$ can for instance be a minimum time interval required to load the second storage elements such as the programmable memory elements such as flip-flops or two-bit memories or a multibit memories provided the number of bits of the memory is less than the bit depth of the control signal such as a PWM signal, in an entire line or column of pixels or sub-pixels i.e. making the line or column ready for the next bit of information.

For the first N1 MSBs (with e.g. N1=4 the bits being for instance $b_0$, $b_1$, $b_2$ and $b_3$), the current in the light emitting element 146 of a pixel or sub-pixel is controlled as was previously described and is determined by the value of the first N1 bits during the entire time interval (sub-period or bitblock).

For the last N2 LSBs (with e.g. N2=2 the bits being $b_{-1}$ and $b_{-2}$), the current in the light emitting element 146 of a pixel or sub-pixel is determined by the value of the last N2 bits during a first part of the time interval $T_0$ (duration of the sub-period associated to $b_0$ or duration of a bitblock) and by the value of the reset signal RST during a second part of the time interval $T_0$. The sum of the duration of the first part of the time interval and the duration of the second part of the time interval is equal to the duration of the time interval $T_0$.

In the example of FIG. 18, the following is assumed: $b_{-1A}=1$, $b_{-1B}=0$, $b_{-1C}=1$ and $b_{-2A}=0$, $b_{-2B}=1$, $b_{-2C}=0$. By activating the RST signal before the end of the time interval $T_0$ for all of the pixels or sub-pixels for which the second storage elements e.g. the memory programmable elements such as flip-flops or two-bit memories or multibit memories provided the number of bits of the memory is less than the bit depth of the control signal such as a PWM signal, are daisy chained, the voltage at the gate 1433 of the control element such as e.g. pMOS transistor 143 of each of these pixels or sub-pixels is set to the supply voltage VDD thereby closing the control element such as the transistor 143 and interrupting the current $I_{Ref}$ through the light emitting element such as the LED or OLED 146. If the reset signal RST is activated before the end of the time interval $T_0$, it is in effect guaranteed that the bits $b_{-1}$ and $b_{-2}$ will have a lesser weight than the bit $b_0$. On FIG. 18, the RST signal is set high in the middle of the time interval $T_0$ for $b_{-1}$. The current through the light emitting element such as the LED or OLED 146 will return to zero at that time. For $b_{-2}$, the RST signal is set high ¼ $T_0$ after the beginning of the bit block of duration $T_0$.

The reset signal RST can be applied at the same time for all the pixels or sub-pixels in the same column (or the same line). Alternatively, the reset signal RST can be applied at the same time for all the pixels or sub-pixels in the pixel array (with N lines and M columns). Alternatively, the reset signal RST is applied to a subset of the pixels or sub-pixels in the same column (or the same line) or to a subset n×m (with n<N and m<M) of the pixels or sub-pixels in the pixel array.

Embodiments of the present invention offer a solution to the problem of increasing the bit depth (i.e. the number of bits) with which the brightness/luminance of a (sub-)pixel is encoded.

If a (LED or OLED) solid state display has been designed to operate with a minimum PWM sub-period $T_0$ or bitblock of duration $T_0$, applying a reset signal as described in embodiments of the present invention allows one to increase the bit depth beyond what is possible with the solution known to the art.

FIG. 19 shows, with an example (N1=4 and N2=2), how the reset signal RST varies in function of time and in function of the PWM sub-period (for each bit $b_i$). The sub-periods T1, T2 and T3 that correspond to the bit $b_1$, b2 and b3 each have a duration that matches the weight of the bit i.e. $T_1=2*T_0$; $T_2=4*T_0$ and $T_3=8*T_0$. The sub-periods that correspond to the additional bit $b_{-1}$ and $b_{-2}$ have the same duration $T_0$ as the sub-period corresponding to the bit $b_0$. This limitation is imposed by e.g. the minimum amount of time it takes to load the second storage elements, e.g. the programmable memory elements such as flip-flops 141 or two-bit memories or multibit memories provided the number of bits of the memory is less than the bit depth of the control signal such as a PWM signal, in e.g. the same column of pixels. Since the second storage elements, e.g. the programmable memory elements such as flip-flops 141 (or two-bit memories or multibit memories provided the number of bits of the memory is less than the bit depth of the control signal such as a PWM signal), in the circuits of e.g. FIGS. 14 and 15 are updated with one bit (e.g. $b_1$) while the previous bit (e.g. $b_0$) still determines the current in the light emitting element such as the LED or OLED 146, the bit $b_1$ must be loaded before the end of the sub-period during which $b_0$ is used.

If the sub-period for bit $b_{-1}$ is ½ $T_0$ (as would be the case according to Table 2), the following bit b-2 will not necessarily have been loaded at the time it is needed to drive the current. This is true whether the bits are shifted through a column or line-wide shift register to reach their destination or whether a scanline is used.

The prior art addresses this problem by using a multi-bit memory element: the sequence of bits $b_0$, $b_1$, $b_2$, $b_3$ is first loaded in a local shift-register and then the bits are used successively to drive the current by clocking them at increasing time intervals. This has an impact on (a) the load time (not used to display information) and (b) the size of the memory element.

The inventors realized that they could override the driving signal for bits which would normally have a sub-period smaller than $T_0$.

The sub-period for bits $b_{-1}$ (and $b_{-2}$) starts exactly as for the other bits: the bit $b_{-1}$ stored by the flip-flop is "copied" (or loaded or transferred) on first storage element such as a capacitor or a capacitive circuit such as the sample and hold device 144, e.g. the capacitor $C_{SH}$ or an unclocked flip-flop. Once the transfer is completed, the next bit ($b_{-2}$) is being loaded on the second storage element e.g. the programmable memory element such as the flip-flop 141. As explained earlier, the next bit might not be available before a time $T_0$ which is larger than the time ½ $T_0$. Unless one shortens the time during which the bit $b_{-1}$ controls the current in the light emitting element such as the LED or OLED 146, the bit $b_{-1}$ will have the same weight as the bit $b_0$.

FIG. 17 shows an alternative implementation for a pixel according to the invention.

In the description of the circuit illustrated on FIG. 17:

- the control element is, for example, a transistor 143 and the first control electrode 1433 is, for example a gate of the transistor 143; the transistor can be a pMOS transistor, e.g. a thin film transistor; the transistor can be connected to a LED or OLED diode light emitting device 146 for driving it. The transistor can be operatively connected with a light source such as a LED or OLED and operatively connected with a current source 145;
- the first storage element can be a capacitor or a capacitive circuit such as a sample and hold device e.g. a sample and hold device such as a sample and hold capacitor 144 or an unclocked flip flop; the first storage element such as the capacitor, e.g. the sample and hold capacitor 144 is connected between the gate 1433 and a supply voltage VDD;

- The second storage element can be a flip-flop 141 or a two-bit memory or a multibit memory provided the number of bits of the memory is less than the bit depth of the control signal such as a PWM signal;
- the transfer element is, for example, a transistor 142, such as a pMOS transistor, e.g. a TFT transistor;
- reset element such as reset switch 171;
- a light emitting element such as an OLED or LED pixel or sub-pixel 146;
- a current source 145.

A reset element such as the reset switch 171 is connected in parallel with the first storage element, e.g. the capacitor or the capacitive circuit such as the sample and hold device 144 having a sample and hold capacitor $C_{SH}$ as shown on FIG. 17 or an unclocked flip-flop. The reset element such as the reset switch 171 is closed before the end of the time interval $T_0$:

- For bit $b_{-1}$, the reset element such as the reset switch 171 is closed at ½ $T_0$ after the start of the sub-period of duration $T_0$. As a result, the current in the first half of the time interval is determined by $b_{-1}$ (i.e. the current is 0 if $b_{-1}$=0 and the current is $I_{Max}$ if $b_{-1}$=1) and is zero in the second half of the time interval (as determined by the state of the reset element such as the reset switch 171 that shunts the capacitor $C_{SH}$ (144) when it is closed.
- For bit $b_{-2}$, the reset element such as the reset switch is closed at ½ $T_0$ after the start of the sub-period of duration $T_0$. As a result, the current in the first quarter of the time interval is determined by $b_{-2}$ (i.e. the current is 0 if $b_{-2}$=0 and the current is $I_{max}$ if $b_{-2}$=1) and is zero in the remaining three quarter of the time interval (as determined by the state of the switch 171 that shunts the capacitor $C_{SH}$ (144) when it is closed).
- For bit $b_{-n}$, the reset switch is closed at $2^{-n}$ To after the start of the sub-period of duration $T_0$.

In the example here above, for the first N1 MSBs (with e.g. N1=4 the N4 MSBs being for instance $b_0$, $b_1$, $b_2$ and $b_3$), the current in the light emitting element 146 of a pixel or sub-pixel is determined by the value of the first N1 bits during the entire time interval (sub-period or bitblock).

For each of the last N2 LSBs (with e.g. N2=2 the N2 LSBs being $b_{-1}$ and $b_{-2}$), the current in the light emitting element 146 of a pixel or sub-pixel is determined by the value of the bit during a first part of the time interval (sub-period or bitblock) and by the value of the reset signal RST during a second part of the time interval. The sum of the duration of the first part of the time interval and the duration of the second part of the time interval is equal to the duration of the time interval.

This allows one to modify the bit depth with which the signal controlling the current in the light emitting elements 146 is encoded. The technique circumvents the limitation caused by timing (minimum value for $T_0$, maximum value for T) and size (e.g. the size of the second storage element. e.g. the programmable memory element (such as a flip-flop or a two-bit memory or a multibit memory provided the number of bits of the memory is less than the bit depth of the control signal such as a PWM signal)), when more than one bit must be loaded before controlling the current.

The contribution of bits $b_{-1}$ and $b_{-2}$ over the duty cycle can be evaluated. Whether one uses bit blocks or PWM sub-periods, the duration T of one PWM period with the duty cycle encoded on the six bits $b_{-1}$, $b_{-2}$, $b_0$, $b_1$, $b_2$ and $b_3$ is $T=T_0+T_0+T_0+2*T_0+4*T_0+8*T_0=17*T_0$.

Since the pulses corresponding to $b_{-1}$ and $b_{-2}$ are cut to 0 after ½ $T_0$ and ½ $T_0$, the maximum duty cycle that can be achieved is less than 100%:

$$DC_{Max}=15{,}75T_0/17T_0\approx 0{,}93 \text{ (or 93\%)}.$$

The bit depth usually used for an OLED or LED display is at least 12 (instead of e.g. 4 as in the example). By using the reset signal RST, the inventors realized that they could increase the bit depth to e.g. 16 bits (i.e. by adding the lesser significant bits $b_{-4}$, $b_{-3}$, $b_{-2}$ and $b_{-1}$ to the standard 12 bits $b_0$, $b_1$, $b_2$, $b_3$, $b_4$, $b_5$, $b_6$, $b_7$, $b_8$, $b_9$, $b_{10}$ and $b_{11}$.

The maximum duty cycle in that case is $$DC_{Max}=[(1/16+1/8+1/4+1/2)+2^{12}-1]/(4+2^2-1)\approx 0{,}99925\ldots \text{ (or 99,925\%)}.$$

The smallest duty cycle increment with 12 bits (without using the global RST signal) will be:

$$\Delta_{Min}\, DC=1/4095\approx 0{,}00025 \text{ (or 0,025\%)}.$$

The smallest duty cycle increment with 12 bits+the 4 lesser significant bits $b_{-4}$,$b_{-3}$, $b_{-2}$ and $b_{-1}$ (and using the RST signal) will be:

$$A_{Min}\, DC=1/16/(4+2^{12}-1)\approx 0{,}000015 \text{ (or 0,0015\%)}$$

The mere addition of the reset element such as the reset switch 171 and the global reset signal RST provides an improvement of the resolution of the grayscale by a factor 16 without significant impact on the maximum duty cycle and without impact on the resolution of the array of pixels or sub-pixels (for example, the switch 171 can be one single thin film transistor).

In a further example of embodiments, the shift registers of one display tile can be daisy chained with the shift registers of an adjacent display tile thereby facilitating the assembly of tiled displays wherein each tile is composed of N×M pixels (i.e. N columns of M pixels) according to an embodiment of the present invention. FIG. 15 illustrates how the shift registers of pixels in the same column can be daisy chained to form a column-wide shift register. The concept of column of pixels is usually limited to pixels for which the thin film transistors were formed in the same substrate. In a large display, several substrates can be assembled together. One of the major difficulties of assembling different substrates is how to connect these different substrates while keeping the distance between two adjacent substrates to a minimum. FIG. 20 illustrates how embodiments of the present invention address the problem of connecting different substrates.

A first substrate 2001, a second substrate 2002 and a third substrate 2003 are positioned next to each other along a direction DIR that is parallel to the direction of the columns of pixels on the first, second and third substrate. The substrates can be semiconductors (less preferred) being preferably insulating for use with thin film processing. Such substrates can be insulating substrates like polyimide, glass, quartz, diamond, sapphire, etc. Substrates are carriers to process the different layers of conductive and non-conductive material on top of it.

The second storage elements e.g. the programmable memory elements for example flip-flops (like e.g. 2004 and 2005 on second substrate 2002) on each substrate are connected (per column) to form a column wide shift register like e.g. 2006, 2007 and 2008 on the substrates 2001, 2002 and 2003, respectively.

Each shift register needs two input signals; a data signal (i.e. the bits encoding the PWM signal for each of the light emitting elements such as LEDs or OLEDS in the same column) and a clock signal as was described earlier. The data signal can be shifted to the next shift register (e.g. 2007) if a connection is made between the last second storage element such as between the Q electrode of the last flip-flop of the column wide shift register 2006 on substrate 2001 and the first second storage element e.g. the D electrode of the first flip-flop of the column wide shift register 2007 on substrate 2002. For the sake of simplicity, any buffer, level shifter . . . have been omitted that might be used to protect the circuits on each substrate and that may exist between the last flip-flop in shift register 2006 and the first flip-flop in shift register 2007.

FIG. 21 illustrates an active matrix display in which the select lines, select a full row. The data lines are used to provide the data for each column. Line 0 is selected (through select 0), all other select lines are disabled. By doing this, the switch 148 in FIG. 14C is closed. The data is put on each of the column data lines (DATA 0->Data 2) for ROW 0. By doing this, the value on each of the data lines in each element of the same row is stored in element 147 in FIG. 14C Then select line 0 is deselected. Then line 1 is selected. Data is put on each of the column data lines for ROW 1 . . . . This sequence is repeated until the full height of the active matrix display is loaded with data.

Figure 1:
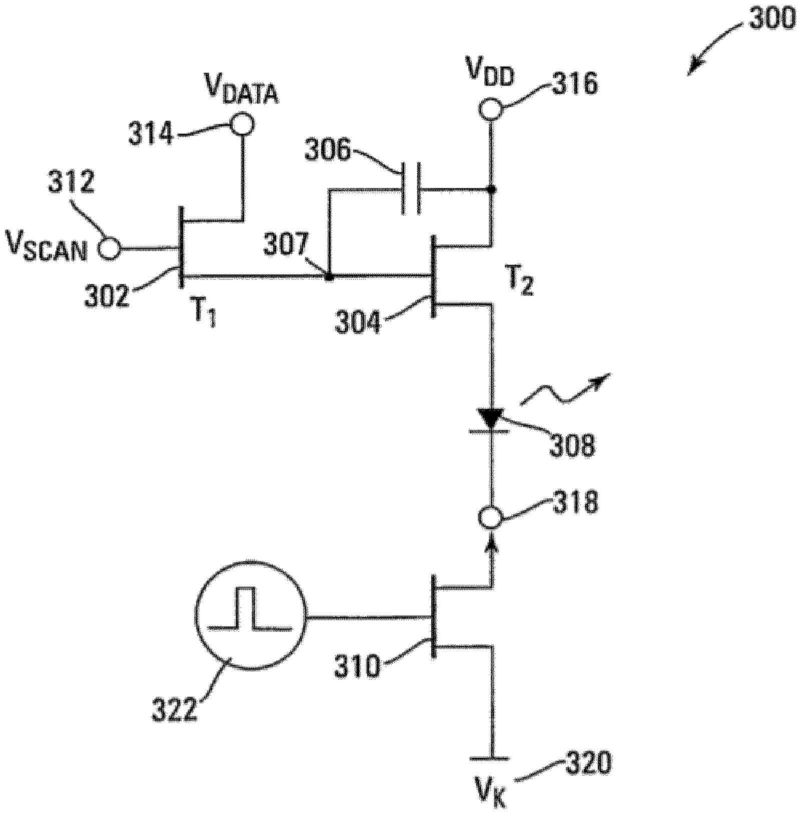
FIG. 1 shows a schematic drawing of an active matrix pixel driver circuit according to the art wherein the PWM signal is used for dimming.

This selecting of lines is a preferred technique to get data into each separate element of the active display. A simpler active matrix example (2TIC) is shown in FIGS. 1 and 3 and can be driven by the same way as described above. These methods can be extended to include the current control or driver circuits of FIGS. 14A, 17, 22-27 or similar.

In a further embodiment of the present invention as shown in FIG. 22, a reset signal RST is used as shown in FIG. 17 with an amendment to the way that the control element such as a transistor 1434 controls the current through the light emitting element e.g. an OLED or LED of a pixel or subpixel 146. Reference numbers in FIG. 22 refer to the same circuit elements shown in FIG. 17 with the exception of the bypass switch or transistor 1434. Instead of putting a control element such as a TFT transistor 143 in series with the light emitting element such as an LED or OLED 146 of a subpixel or pixel to switch the current through the light emitting element such as the LED or OLED 146, the light emitting element is shorted directly with the control element such as a TFT transistor 1434. The principle is the same, i.e. to switch the current through the light emitting element 146 on and off with the control signal such as a PWM driving signal. An advantage of this schematic is that the current source 145 is always delivering current, whether or not through the light emitting element 146. This means the power consumption would be constant and not depending on the light output. This embodiment is herewith explicitly disclosed to include this current control or driver circuit applied to the circuits of FIGS. 14A, 14C, 22-27 or similar.

FIG. 23 shows an alternative arrangement of the reset device 149 e.g. a transistor according to an embodiment of the present invention. Circuit elements with the same reference numbers refer to the same element in FIG. 17 except the reset device 149 e.g. a switch such as a transistor functions as a control element and is connected to bypass the light emitting element 146. When the reset element or switch 149 is closed the current from the current source 145 bypasses the light emitting element 146 and no current passes through the light emitting element 146. When the reset element or switch 149 is open the current from the current source 145 passes through the light emitting element 146. In this embodiment, when the reset signal RST is high, the reset element such as the switch 149 is closed and when the reset signal RST is low, the reset element or switch 149 is open.

In this embodiment as soon as the reset is active, there can flow no current through the light emitting element 146. *Ibis* can be done as follows:

1) Reset the bit value stored in the first storage element (e.g. capacitor 144), therefore opening switch 143 and, thus, no current can flow through the light emitting element 146.

2) Shorting the light emitting element 146 with the reset device 149 such as a switch being open, there will flow no current through the light emitting element 146. When the reset device 149 is active, ghosting of the light emitting element 146 can be avoided as a power electrode such as the anode of the light emitting element 146 is completely discharged. Ghosting is a phenomenon in light emitting elements like an OLED or a LED, when the current source 145 is disconnected from the light emitting element 146 while this is still emitting light. This can have multiple reasons, one of them is the capacitance of the light emitting element 146 in combination with a voltage present on the anode of the LED or OLED. Another reason of ghosting can be leakage currents. By bypassing the light emitting element 146, this is avoided, which is an advantage. This embodiment is herewith explicitly disclosed to include this current control or driver circuit applied to the circuits of FIGS. 14A, 14B, 22-27 or similar.

Figure 2:
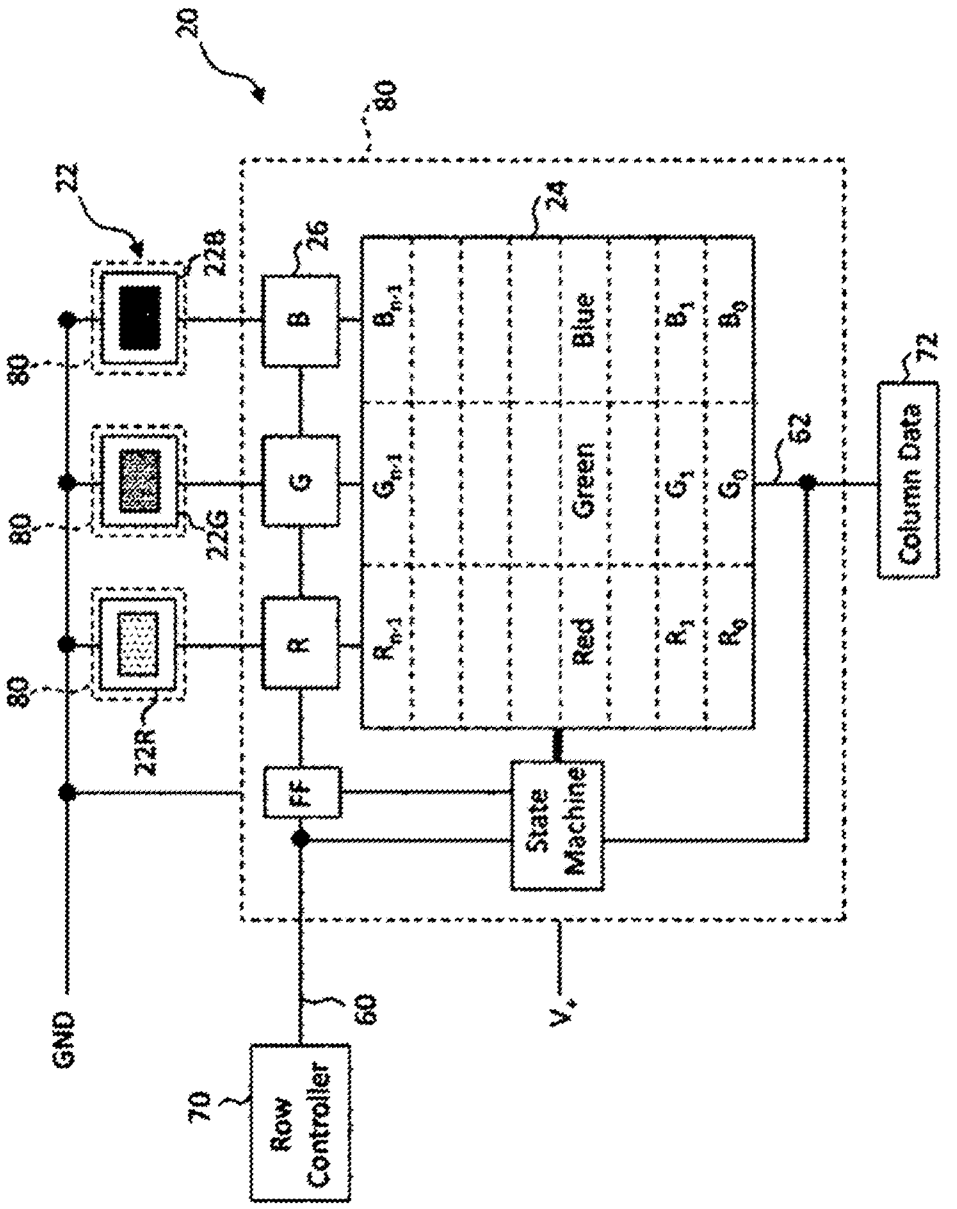
FIG. 2 shows a schematic drawing of an active matrix pixel driver according to the art with banking, wherein the PWM is applied bit per bit during successive PWM timing periods, the bits encoding the PWM signal being stored in a serial memory.

FIGS. 24 to 27 illustrate how a two-bit memory can be implemented in a selection of current control or driver circuits. In these FIGS. 1 and 2 refer to elements relevant to a first bit and a second bit respectively.

FIG. 24 shows a two-bit memory applied to the circuit of FIG. 14A. The number of bits in memory should be less than the bit depth of the control signal such as a PWM signal. The basic reference numbers, i.e. 143 in the reference number 1431-1, refer to the same elements as in FIG. 14A. This two-bit circuit can be extended to any number of bits by increasing the number of current sources 145 and the memory devices 141 and other components as indicated in FIG. 24. The number of bits in memory should be less than the bit depth of the control signal such as a PWM signal. The storage elements 144-1 and 144-2, such as capacitors or a capacitor circuit such as a sample and hold circuit, set the voltage on the gates of the control elements such as transistors 143-1 and 143-2, respectively. One light emitting element 146 is used for a subpixel or pixel of an active display, whereas two current sources 145-1, 145-2 are used for one bit and the second bit, respectively.

FIG. 25 shows a two-bit memory applied to the circuit of FIG. 14C. The basic reference numbers, i.e. 143 in the reference number 1431-1 refer to the same elements as in FIG. 14C. This two-bit circuit can be extended to any number of bits by increasing the number of current sources 145 and the memory select devices 148-1, 148-2 and other components as indicated in FIG. 25. The number of bits in memory should be less than the bit depth of the control signal such as a PWM signal. One light emitting element 146 is used for a subpixel or pixel of an active display whereas two (or more for multibit) current sources 145-1, 145-2 are used for one bit and the second bit, respectively.

FIGS. 26 and 27 show the same principle of duplication of circuit elements to provide a two-bit memory 141 and 141-2 whereas only one light emitting element 146 is used for a subpixel or pixel of an active display. These circuits are based on FIG. 14C but with the use of a two-bit memory such as provided by Flip-Flops. The difference between FIGS. 26 and 27 is that a single data line is used in FIG. 26 and two data lines in FIG. 27.

If there is one dataline with two single bit memories such as Flip-Flops:

a. The time $t_0$ upload the data to the two single bit memories such as Flip-Flops (with twice as many two single bit memories such as Flip-Flops on one line) is Tblock time ×2. However, because two bits are sent at the same time (2 currents), the number of TBlocks (1 bit/TBlock) is divided by two.

b. Thus, there is a balanced or null operation (Same Clk speed).

If there are two datalines:

c. The time $t_0$ upload the data to the two single bit memories, such as Flip-Flops, stays the same (#FF's/line doesn't change); however, because two bits are now sent two at the same time (2 currents), the number of TBlocks is doubled.

d. Thus, the refresh rate of the active matrix display is twice as high or with the same amount of TBlocks, the clock speed can be divided by two.

It is herewith exclusively disclosed the use of two data lines as described above with any of the embodiments of the present invention that use a two-bit memory such as those described with reference to FIG. 24 or 25.

These two-bit circuits can be extended to any number of bits by increasing the number of current sources 145 and the memory devices 141-1, 141-2 and other components as indicated in FIGS. 26 and/or 27. The number of bits in memory should be less than the bitdepth of the control signal such as a PWM signal.

ASPECTS OF THE PRESENT INVENTION

Aspects

1. An aspect of a driver circuit or current control circuit for an active matrix display to drive pixels or sub-pixels of the active matrix display, the driver circuit or current control circuit comprising:

a control element with a first control electrode, to control flow of current through a light emitting element.

a first storage element to store a first value of a control signal, said control signal being applied to the first control electrode of the control element;

a second storage element to store a second value of the control signal;

a transfer element with a second control electrode to load the first storage element with the second value of the control signal, wherein the number of bits stored by the first storage element and/or the second storage element is less than the bit-depth of the resolution of the control signal.

2. An aspect of a driver circuit or current control circuit according to aspect 1, configured so that loading of the first storage element occurs when the active matrix display is displaying.

3. An aspect of a driver circuit or current control circuit according to aspect 1 or 2, wherein the first and/or second storage element stores one bit.

4. An aspect of a driver circuit or current control circuit according to any previous aspect for a plurality of driven pixels or driven sub-pixels, comprising a plurality of control elements each with a first control electrode, each first control electrode being to control flow of current through a light emitting element of the subpixels or pixels.

5. An aspect of a driver circuit or current control circuit of aspect 4, further comprising a plurality of first storage elements, each to store the first value of the control signal, said control signal being applied to the first or each of the first control electrodes of the control elements.

6. An aspect of a driver circuit or current control circuit according to aspect 5, further comprising a plurality of second storage elements, each to store a second value of the control signal.

7. An aspect of a driver circuit or current control circuit according to aspect 6, further comprising a plurality of transfer elements, each with a second control electrode to load the first storage element with the second value of the control signal.

8. An aspect of a driver circuit or current control circuit according to any of aspects 4 to 7, wherein the pixels or sub-pixels are arranged in an array of columns and rows.

9. An aspect of a driver circuit or current control circuit according to any previous aspect, wherein a second control signal is applied on the or each second storage element while the first control signal is applied to the first control electrode of the control element or each control element to control the current in the or each light emitting element.

10. An aspect of a driver circuit or current control circuit according to any previous aspect, wherein the control element is a first transistor.

11. An aspect of a driver circuit or current control circuit according to aspect 10, wherein the first control electrode is a gate of the first transistor.

12. An aspect of a driver circuit or current control circuit according to any previous aspect, wherein the first storage element is a capacitor a sample and hold device with a sample and hold capacitor or an unclocked flip-flop.

13. An aspect of a driver circuit or current control circuit according to any previous aspect, wherein the second storage element is a first programmable memory element.

14. An aspect of a driver circuit or current control circuit according to aspect 13, wherein the first programmable memory element is a first one-bit memory or a first clocked bistable element or a first flip-flop.

15. An aspect of a driver circuit or current control circuit according to any previous aspect, wherein the transfer element is a second transistor.

16. An aspect of a driver circuit or current control circuit according to any previous aspect, wherein PWM bits are stored one bit at a time in a one-bit memory cell.

17. An aspect of a driver circuit or current control circuit according to aspect 16, wherein the one-bit memory is a first D-flip-flop.

18. An aspect of a driver circuit or current control circuit according to aspect 17, wherein the first D-flip flop has an input (D) and an output.

19. An aspect of a driver circuit or current control circuit of the active matrix display according to any of the previous aspects, wherein the active matrix display comprises columns C and rows R of pixels or subpixels, first second storage elements, first programmable memories or first flip-flops of adjacent pixels in the same column C or the same row R of an array of pixels being daisy chained.

20. An aspect of a driver circuit or current control circuit according to any previous aspect, wherein there is one driver or current control circuit per colour sub-pixel or driver circuit or current control circuit per colour pixel.

21. An aspect of a driver circuit or current control circuit according to any previous aspect, wherein there is more than one sub-pixel for each pixel.

22. An aspect of a driver circuit or current control circuit according to aspect 19, wherein the daisy chain limits the number of separate tracks that would otherwise be required to control each pixel or sub-pixel of the array.

23. An aspect of a driver circuit or current control circuit according to any of the aspects 14 to 22, wherein the output Q of first flip-flop is updated by a clock signal (Clk).

24. An aspect of a driver circuit or current control circuit according to any of the aspects 15 to 23, wherein the second transistor is used as a first switch that, when closed, connects the output of a first second storage element or the first flip-flop to the first control electrode of the control element, or to the gate of the first transistor and with an electrode of the first storage element or with a capacitor electrode of the sample and hold device such as the sample and hold capacitor.

25. An aspect of a driver circuit or current control circuit according to any previous aspect, wherein the transfer element or the second transistor is controlled by an enable signal (EN).

26. An aspect of a driver circuit or current control circuit according to any of the aspects 15 to 25, wherein the second transistor is a PMOS transistor that connects the output QB that can also be referred to as Q or & of the first flip-flop to the gate of the first transistor when the enable signal is low or at GND.

27. An aspect of a driver circuit or current control circuit according to any of the aspects 1 to 25, wherein the second storage element is a clocked flip-flop or a capacitor.

28. An aspect of a driver circuit or current control circuit according to aspect 26 or 27 configured so that at the same time, the first storage element or the sample and hold device such as the sample and hold capacitor with a first capacitor electrode or an unclocked flip-flop connected to the control electrode of the control element or the gate of the first transistor and with a second electrode of the first storage element or a second capacitor electrode connected to a supply voltage (VDD), samples the voltage $V_{out}$ at the output of the second storage element or the flip-flop and will hold the control electrode of the control element or the gate of the first transistor at the same voltage even when the second transistor, which is operating as the first switch, is opened.

29. An aspect of a driver circuit or current control circuit according to any previous aspect, wherein the first transistor is a second switch.

30. An aspect of a driver circuit or current control circuit according to aspect 29, wherein, when closed, the second switch connects a current source with a light emitting element such as a LED (light emitting diode) or Organic light emitting diode (OLED) and the LED or OLED emits light.

31. An aspect of a driver circuit or current control circuit according to aspect 30, wherein, when the second switch is open, no current flows through the LED or OLED and it emits no light.

32. An aspect of a driver circuit or current control circuit according to any previous aspect, wherein the first transistor is a PMOS, connected to the inverting output QB instead of to the output Q of the first flip-flop.

33. An aspect of a driver circuit or current control circuit according to aspect 32, wherein a PMOS transistor is used for the second switch, a "low" signal or GND voltage will close that second switch and allow the current of current source 145 to flow through the LED or OLED.

34. An aspect of a driver circuit or current control circuit according to aspect 33, configured so that that when a bit bi,j is 'high' i.e. when the bit bi,j is equal to '1', the LED or OLED emits light when the first switch is closed and that when bit bi,j is 'low' i.e. when the bit bi,j is equal to '0' (and $\overline{bi,j}$ at the output QB is high), the LED or OLED does not emit light when the first switch is closed and the value of $\overline{bi,j}$ is sampled and held by the sample and hold device such as the sample and hold capacitor or an unclocked flip-flop.

35. An aspect of a driver circuit or current control circuit according to any of the aspects 14 to 34, wherein once the output of the second storage element or the first flip-flop has been sampled and stored on the sample and hold device such as the sample and hold capacitor or on an unclocked flip-flop, the first switch can be opened and the next bit can be stored in the second storage element.

36. An aspect of a driver circuit or current control circuit according to any previous aspect, wherein bits stored in the second storage element can be updated without interrupting the display of an image.

37. An aspect of a driver circuit or current control circuit according to any of the previous aspects, configured so that the control signal applied to the first control electrode of the first control element by means of the first storage element can be overridden.

38. An aspect of a driver circuit or current control circuit according to aspect 37, comprising another switch, wherein overriding the control signal stored on the first storage element is done by means of the another switch that conditionally connects the first control electrode to an alternative control signal.

39. An aspect of a driver circuit or current control circuit according to aspect 38, wherein the first storage element is a capacitor, and the another switch is a reset switch that shunts the first storage element.

40. An aspect of a driver circuit or current control circuit according to aspect 39, wherein the another switch is a transistor or a pMOS thin-film transistor.

41. An aspect of a driver circuit or current control circuit according to any previous aspect, wherein the driver circuit of the current control circuit is used to make a display or a LED display or an OLED display.

42. An aspect of a driver circuit or current control circuit according to any previous aspect, wherein the light emitting elements that are driven is disposed in lines and columns.

43. An aspect of a driver circuit or current control circuit according to aspect 42, wherein each of L lines of the array has M driver circuit or current control circuits and associated light emitting elements.

44. An aspect of a driver circuit or current control circuit according to aspect 43, wherein the second storage element of each circuit in the same column or line is connected to the same data signal line and the second storage element of each circuit in the same line or column is connected to the same scan line.

45. An aspect of a driver circuit or current control circuit according to aspect 44, wherein a signal applied to the scan line enables the storage of the signal present on the data signal line.

46. An aspect of a driver circuit or current control circuit according to aspect 45, wherein the scan line controls a switch that conditionally brings the data signal line and the second storage element in electrical contact.

47. An aspect of a driver circuit or current control circuit according to aspect 45, wherein, alternatively, the second storage element of each circuit in the same column (or line) can be part of a column wide (or line wide) shift register.

48. An aspect of a driver circuit or current control circuit according to aspect 47, wherein the shift register is realized with thin-film transistors together with the thin-film transistors of the driver circuit or current control circuit.

49. An aspect of a driver circuit or current control circuit according to any previous aspect, comprising means for updating the content of the second storage element, while the content of the first storage element is used to control the current in the light emitting element.

50. An aspect of a driver circuit or current control circuit according to aspect 49, wherein each of the bits meant for the second storage element of a driver circuit or current control circuit in the same column (or line) in an array of driver circuit or current control circuits is applied sequentially to the input of the first second storage element or the first flip-flop in the column (or line) of current control circuits 51. An aspect of a driver circuit or current control circuit according to aspect 49, wherein the means to update the second storage element of the driver circuits or current control circuits in a column (or line) are configured so that N bits are presented sequentially at the input of the column (or line) wide shift register and shifted through the shift register by clocking the shift register with a series of N first clock signals.

52. An aspect of a driver circuit or current control circuit according to aspect 51, wherein the content of the second storage element is then transferred to the first storage element.

53. An aspect of a driver circuit or current control circuit according to any of aspects 46 to 51, wherein the shift registers of adjacent arrays are daisy chained.

54. An aspect of a driver circuit or current control circuit according to any previous aspect, wherein the second storage element is a latch.

55. An aspect of a method to drive a driver circuit or a control circuit of a light emitting element in a display, the method comprising the steps of:

- transferring a control signal from a second storage element to a first storage element;
- controlling the current in the light emitting element in function of said first control signal stored on a first storage element;
- loading the second storage element with a second control signal while the current in the light emitting element is controlled by the first control signal.

56. A aspect of a method to modulate the current in a Light Emitting Element in function of N1 bits+N2 bits, the N2 bits having less weight than the N1 bits; An aspect of the method comprising the steps:

- For each of the $N_1$ bits, the current in the light emitting element is controlled by said $N_1$ bits, one bit at a time and during a time interval with a duration of at least $T_{Min}$;
- For each of the $N_2$ bits, the current in the light emitting element is controlled by said $N_2$ bits, one bit at a time and during a first time interval that is less than $T_{Min}$ and overriding said one of the N2 bits during a second time interval that is less than $T_{Min}$ the sum of the duration of the first time interval and the second time interval being equal to $T_{Min}$.

57. An aspect of the method according to aspect 56, wherein $T_{Min}$=T0.

58. An aspect of the method according to aspect 56 or 57, wherein a reset is used to override a drive signal before the end of $T_{Min}$.

59. An aspect of the method according to any of the aspects 56 to 58, wherein the total number of bits N=N1+N2 is modified without having to modify the duration $T_{Min}$.

60. An aspect of the method according to aspect 59, wherein the total number of bits N=N1+N2 is increased without having to modify the duration $T_{Min}$.

61. An aspect of the method according to any of the aspects 56 to 60, wherein the N1+N2 bits encode an amplitude of the current in the light emitting element.

62. An aspect of the method of any according to the aspects 56 to 61, wherein current is Pulse Width Modulated, in which case, the N1+N2 bits can encode the duty cycle of the PWM signal that will determine the average value of the current during a period T of the PWM signal.

63. An aspect of the method according to aspect 62, wherein the duty cycle is encoded with N=N1+N2 bits with N1≥1 and N2≥0.

64. An aspect of the method according to aspect 63, wherein N2 is smaller than N1.

65. An aspect of the method according to aspect 64, comprising limiting a non-linearity or an error between the bit code such as the integer number represented by the bits N1+N2 and the average current circulating in a light emitting diode, the average being computed over a period T of the PWM signal.

66. An aspect of the method according to any of the aspects 56 to 65, wherein the duration $T_{Min}$ of the time interval is the duration of the current pulse within the PWM period corresponding to the duty cycle of the bits with the least weight among the N1 bits.

67. An aspect of the method according to aspect 66, wherein the entire sequence of bits controls the current during a time interval equal to $(2^{N}{}_{1}-1)*T_{Min}+N2*T_{Min}$ after which the current in the light emitting element is controlled/determined by another sequence of bits.

68. An aspect of the method according to any of the aspects 55 to 67, comprising limiting the number of electrical tracks to carry signals to a light emitting element and its current controlling circuit in an array of light emitting elements.

69. An aspect of the method according to aspect 68, wherein the bits are shifted through a column-wide or line-wide shift register in an array of C column and L line of light emitting elements.

70. An aspect of the method according to aspect 69, wherein the time required to shift a bit from the input of the shift register to its end determines the time interval $T_{Min}$.

71. An aspect of the method of driving a driver circuit or current control circuit according to any of the aspects 1 to 54, the method comprising the steps:

at a first time t0, a data signal bit b0 is presented at the input of the flip-flop, whereby bit b0 can be equal to 1 and at the rising edge of a clocking signal, the output QB of the flip-flop is updated such that QB=$\overline{b0}$.

72. An aspect of the method according to aspect 71, wherein at a second time t1>t0, the output of the second storage element is connected to the first storage element or the sample and hold device which can be a sample and hold capacitor or an unclocked flip-flop.

73. An aspect of the method according to aspect 72, wherein the first switch optionally the second transistor is closed that conditionally connects the output QB of the flip-flop and first storage element which can be a sample and hold device or sample and hold capacitor.

74. An aspect of the method according to any of the aspects 55 to 73, comprising two arrays of two tiles, An aspect of the method comprising connecting a shift register of one tile to a shift register of the next tile.

75. An aspect of the method according to aspect 73 or 74, wherein the first switch is a PMOS transistor, and it is closed by forcing ENB to a low state or ground.

76. An aspect of the method according to aspect 75, wherein whatever voltage which is stored across the first storage element is "erased" and updated in function of the signal at the output QB which is stored on the second storage element implemented as a flip-flop.

77. An aspect of the method according to aspect 76, wherein the updated signal is applied to the control electrode of the control element for a time THold whereby THold can be the duration of a bit block or the duration of a PWM sub-period (T0, T1, T2, T3 . . . ).

78. An aspect of the method according to aspect 77, wherein with the voltage at the control electrode or gate of the control element e.g. at the gate of the first transistor set to zero, current is allowed to flow through the light emitting device (LED) (ILED=IMax).

79. An aspect of the method according to aspect 78, wherein before the end of THold, a new data signal b1 is presented at the input of the flip-flop and the output QB of the flip-flop is updated upon the rising edge of a clock signal, b1=1 with b1 following b0, the flip-flop being the second storage element.

80. An aspect of the method according to any of the aspects 77 to 79, wherein THold has the same duration for each data signal (i.e. if bit blocks are used) or, alternatively, the duration of THold can vary in function of data signal, in particular in function of the weight of the bit stored on the first storage element.

The invention claimed is:

1. A driver circuit or current control circuit for an active matrix display to drive pixels or sub-pixels of the active matrix display, the driver circuit or current control circuit comprising:

a control element with a first control electrode, the first control electrode being configured to control flow of current through a light emitting element;

a first storage element to store a first value of a control signal, said control signal being applied to the first control electrode of the control element;

a second storage element to store a second value of the control signal; and a transfer element with a second control electrode to load the first storage element with the second value of the control signal, wherein the number of bits stored by the first storage element and/or the second storage element is less than the bit-depth of the resolution of the control signal;

wherein the driver circuit or the control circuit is configured to modulate the current in the light emitting element in function of N1 bits+N2 bits, the N2 bits having less weight than the N1 bits; and wherein the driver circuit or the control circuit is configured:

to control for each of the $N_1$ bits the current in the light emitting element by said $N_1$ bits, one bit at a time and during a time interval with a duration of at least $T_{Min}$, and to control for each of the $N_2$ bits, the current in the light emitting element by said Na bits, one bit at a time and during a first time interval that is less than $T_{Min}$, and to override said one of the $N_2$ bits during a second time interval that is less than $T_{Min}$, the sum of the duration of the first time interval and the second time interval being equal to $T_{Min}$.

2. The driver circuit or current control circuit according to claim 1, wherein the active matrix display comprises columns C and rows R of pixels or subpixels, first second storage elements, first programmable memories or first flip-flops of adjacent pixels in the same column C or the same row R of an array of pixels being daisy chained.

3. The driver circuit or current control circuit according to claim 2, wherein the daisy chain limits the number of separate tracks that would otherwise be required to control each pixel or sub-pixel of the array.

4. The driver circuit or current control circuit according to claim 1, further configured so that the control signal applied to the first control electrode of the first control element by means of the first storage element can be overridden.

5. The driver circuit or current control circuit according to claim 4, further comprising another switch, wherein overriding the control signal stored on the first storage element is done by means of the another switch that conditionally connects the first control electrode to an alternative control signal.

6. The driver circuit or current control circuit according to claim 5, wherein the first storage element is a capacitor, and the another switch is a reset switch that shunts the first storage element.

7. The driver circuit or current control circuit according to claim 1, further comprising means for updating the content of the second storage element, while the content of the first storage element is used to control the current in the light emitting element.

8. The driver circuit or current control circuit according to claim 7, wherein each of the bits meant for the second storage element of a driver circuit or current control circuit in the same column or line in an array of driver circuit or current control circuits is applied sequentially to the input of the first second storage element or the first flip-flop in the column or line of current control circuits.

9. The driver circuit or current control circuit according to claim 7, wherein the means to update the second storage element of the driver circuits or current control circuits in a column or line are configured so that N bits are presented sequentially at the input of the column or line wide shift register and shifted through the shift register by clocking the shift register with a series of N first clock signals.

10. The driver circuit or current control circuit according to claim 9, further configured to then transfer the content of the second storage element to the first storage element.

11. The driver circuit or current control circuit according to claim 7, wherein the shift registers of adjacent arrays are daisy chained.

12. A method to drive a driver circuit or a control circuit of a light emitting element in a display the method comprising the steps of:

transferring a control signal from a second storage element to a first storage element;

controlling the current in the light emitting element in function of said first control signal stored on a first storage element; and loading the second storage element with a second control signal while the current in the light emitting element is controlled by the first control signal;

wherein the current in the light emitting element is modulated in function of N1 bits+N2 bits, the N2 bits having less weight than the N1 bits; and for each of the $N_1$ bits, the current in the light emitting element is controlled by said $N_1$ bits, one bit at a time and during a time interval with a duration of at least $T_{Min}$, and for each of the $N_2$ bits, the current in the light emitting element is controlled by said $N_2$ bits, one bit at a time and during a first time interval that is less than $T_{Min}$, and further comprising overriding said one of the N2 bits during a second time interval that is less than $T_{Min}$, the sum of the duration of the first time interval and the second time interval being equal to $T_{Min}$.

13. A method to modulate the current in a Light Emitting Element in function of N1 bits+N2 bits, the N2 bits having less weight than the N1 bits; the method comprising the steps:

for each of the $N_1$ bits, the current in the light emitting element is controlled by said $N_1$ bits, one bit at a time and during a time interval with a duration of at least $T_{Min}$, and for each of the $N_2$ bits, the current in the light emitting element is controlled by said $N_2$ bits, one bit at a time and during a first time interval that is less than $T_{Min}$, and overriding said one of the N2 bits during a second time interval that is less than $T_{Min}$, the sum of the duration of the first time interval and the second time interval being equal to $T_{Min}$.

14. The method according to claim 13, wherein a reset is used to override a drive signal before the end of $T_{Min}$.

15. The method according to claim 12, comprising two arrays of two tiles, and the method comprising connecting a shift register of one tile to a shift register of the next tile.

16. The method according to claim 15, wherein the first switch is a PMOS transistor, and is closable by forcing ENB to a low state or ground.

17. The method according to claim 16, wherein voltage which is stored across the first storage element is erased and updated in function of the signal at the output QB which is stored on the second storage element implemented as a flip-flop.

18. The method according to claim 17, wherein the updated signal is applied to the control electrode of the control element for a time THold whereby THold can be the duration of a bit block or the duration of a PWM sub-period (T0, T1, T2, T3 . . . ).

19. The method according to claim 18, wherein with the voltage at the control electrode or gate of the control element, current is allowed to flow through the light emitting device (LED)(ILED=IMax).

20. The method according to claim 19, wherein before the end of THold, a new data signal b1 is presented at the input of the flip-flop and the output QB of the flip-flop is updated upon the rising edge of a clock signal, b1=1 with hi following b0, the flip-flop being the second storage element.

21. The method according to claim 18, wherein THold has the same duration for each data signal or, alternatively, the duration of THold can vary in function of data signal, in particular in function of the weight of the bit stored on the first storage element.

* * * * *